United States Patent
Takemoto et al.

(10) Patent No.: US 9,379,401 B2
(45) Date of Patent: Jun. 28, 2016

(54) FUEL CELL SYSTEM AND METHOD FOR OPERATING SAME

(75) Inventors: Shinichirou Takemoto, Yokohama (JP);
Kazuhiko Osawa, Tokyo (JP); Ichiro Okawara, Hanno (JP); Shinichi Kitano, Hidaka (JP); Michio Omata, Sayama (JP)

(73) Assignees: Nissan Motor Co., Ltd., Yokohama (JP); SAGINOMIYA SEISAKUSHO, INC., Tokyo (JP)

( * ) Notice: Subject to any disclaimer, the term of this patent is extended or adjusted under 35 U.S.C. 154(b) by 734 days.

(21) Appl. No.: 13/582,093

(22) PCT Filed: Feb. 2, 2011

(86) PCT No.: PCT/JP2011/052085
§ 371 (c)(1),
(2), (4) Date: Aug. 31, 2012

(87) PCT Pub. No.: WO2011/114787
PCT Pub. Date: Sep. 22, 2011

(65) Prior Publication Data
US 2013/0004868 A1    Jan. 3, 2013

(30) Foreign Application Priority Data

Mar. 19, 2010    (JP) .................................. 2010-064079

(51) Int. Cl.
*H01M 8/04* (2016.01)
*H01M 8/06* (2016.01)
(Continued)

(52) U.S. Cl.
CPC ........ *H01M 8/0687* (2013.01); *H01M 8/04223* (2013.01); *F16K 27/029* (2013.01); *F16K 31/088* (2013.01); *F16K 31/12* (2013.01); *H01M 2008/1095* (2013.01); *Y02E 60/50* (2013.01)

(58) Field of Classification Search
None
See application file for complete search history.

(56) References Cited

U.S. PATENT DOCUMENTS 8,216,730 B2    7/2012  Kajiwara
2008/0299423 A1*  12/2008  LaVen .............................. 429/17
(Continued)

FOREIGN PATENT DOCUMENTS

CN    101523652 A    9/2009
JP    63-11059    1/1988
(Continued)

OTHER PUBLICATIONS

An English translation of the Chinese Office Action for the corresponding Chinese patent application No. 201180012435.2 issued on Aug. 12, 2014.
(Continued)

*Primary Examiner* — Ula C Ruddock
*Assistant Examiner* — Matthew Van Oudenaren
(74) *Attorney, Agent, or Firm* — Global IP Counselors, LLP

(57) ABSTRACT

A fuel cell system has a fuel cell for generating electricity by reacting a fuel gas with an oxidant gas and an exhaust flow passage for exhausting the fuel exhaust gas exhausted from a fuel electrode 16 of the fuel cell to the outside. The fuel cell system is equipped with a movable filter device disposed in the exhaust flow passage, so that by activating the movable filter device, water and foreign particles adhering to the filter are quickly scattered by rotational centrifugal force and vibration, thereby preventing the exhaust flow passage from being blocked by the clogging by water freeze and foreign particles and also reducing startup time.

18 Claims, 27 Drawing Sheets

(51) Int. Cl.
  *F16K 27/02* (2006.01)
  *F16K 31/12* (2006.01)
  *F16K 31/08* (2006.01)
  *H01M 8/10* (2016.01)

(56) References Cited

U.S. PATENT DOCUMENTS

2010/0015482 A1* 1/2010 Kajiwara .................. 429/22
2010/0151344 A1* 6/2010 Otomaru et al. .......... 429/444

FOREIGN PATENT DOCUMENTS

| JP | 3-36110 | 2/1991 |
|---|---|---|
| JP | 3-52183 | 3/1991 |
| JP | 5-329400 | 12/1993 |
| JP | 10-26469 | 1/1998 |
| JP | 10-223246 | 8/1998 |
| JP | 2006-79882 A | 3/2006 |
| JP | 2007-216151 | 8/2007 |
| JP | 2008-108434 | 5/2008 |
| JP | 2008-270151 | 11/2008 |
| WO | 2008/114120 A1 | 9/2008 |
| WO | WO2008114120 * | 9/2008 |

OTHER PUBLICATIONS

International Search Report of PCT/JP2011/052085, dated Apr. 12, 2011, mailed Apr. 26, 2011.

* cited by examiner

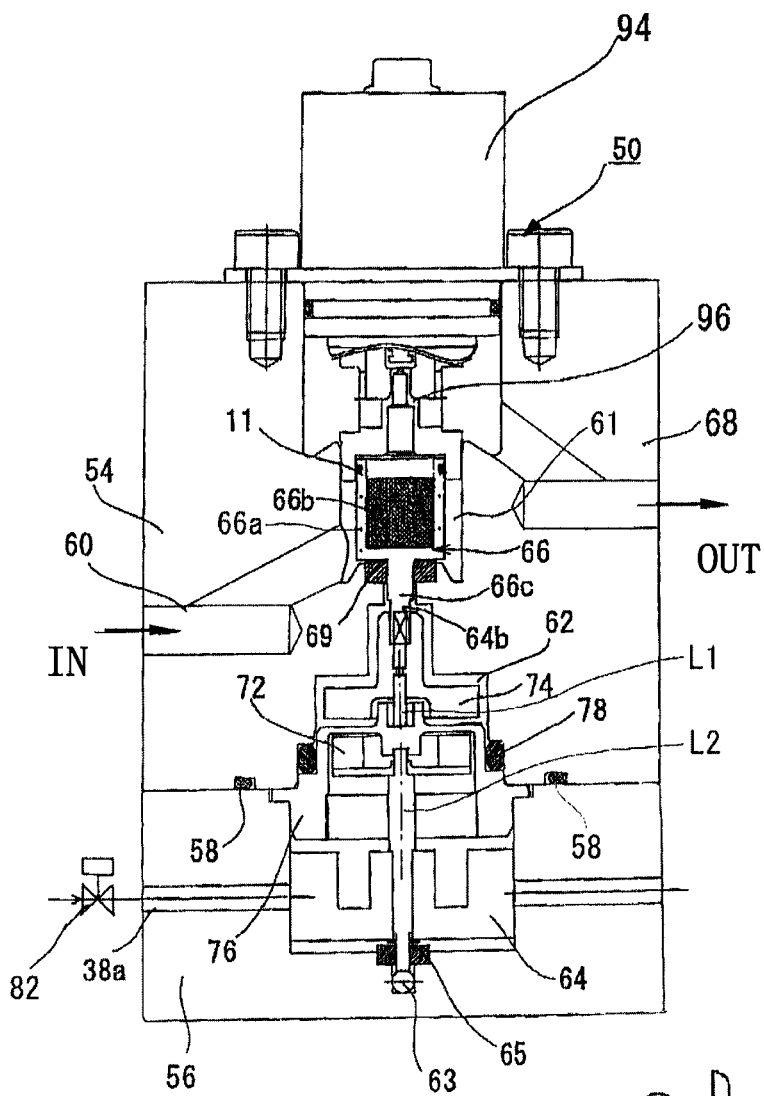
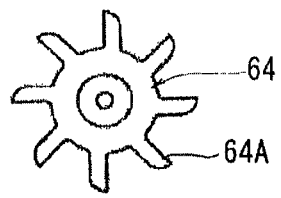
FIG. 29A
FIG. 29B

US 9,379,401 B2

FUEL CELL SYSTEM AND METHOD FOR OPERATING SAME

CROSS-REFERENCE TO RELATED APPLICATIONS

This application is a U.S. National stage of International Application No. PCT/JP2011/052085, filed Feb. 2, 2011. This application claims priority to Japanese Patent Application No. 2010-064079, filed on Mar. 19, 2010.

BACKGROUND

1. Field of the Invention

The present invention relates to a fuel cell system comprising a fuel cell that generates electricity with a reaction between a fuel gas and an oxidant gas and an exhaust flow passage for a fuel exhaust gas of the fuel cell. The invention also relates to a method of operating the fuel cell system.

2. Background Information

Japanese Laid-Open Patent Publication No. 2008-270151 presents an example of a conventional fuel cell system comprising a fuel cell that generates electricity with a reaction between a fuel gas and an oxidant gas and an exhaust flow passage that guides a fuel exhaust gas discharged from the fuel cell to outside the system. In the fuel cell system presented in Japanese Laid-Open Patent Publication No. 2008-270151, a valve (purge valve) is provided in the exhaust flow passage to open and close the exhaust flow passage and a filter is provided in the valve to remove foreign particles.

With this type of fuel cell system, if water vapor or other form of moisture is contained in the fuel exhaust gas, then there is a likelihood that moisture will condense inside the exhaust flow passage and water will collect. Water adheres particularly readily to the mesh of the filter. Consequently, when the system is stopped and allowed to sit in a low-temperature environment, there is a possibility that water adhered to the filter will freeze and block the exhaust flow passage.

Therefore, the fuel cell system of Japanese Laid-Open Patent Publication No. 2008-270151 is provided with a heater configured to heat the filter and an orifice inside the valve. When the fuel cell is started, the heater is operated to prevent the frozen moisture from blocking the exhaust flow passage.

SUMMARY

However, although the conventional fuel cell system just explained can prevent a blockage of the exhaust flow passage for the fuel exhaust gas, heating the heater requires time at startup and shortening the startup time has been a challenge.

The present invention was conceived in view of the aforementioned challenge of the conventional technology and its object is to provide a fuel cell system and an operating method thereof that can prevent frozen moisture from blocking the exhaust flow passage and also achieve a shorter startup time.

A fuel cell system according to the present invention comprises a fuel cell that generates electricity with a reaction between a fuel gas and an oxidant gas and an exhaust flow passage that guides a fuel exhaust gas discharged from a fuel electrode of the fuel cell to outside the system. The fuel cell system is further equipped with a movable filter device that is arranged in the exhaust flow passage and serves to solve the aforementioned challenge of the conventional technology.

A fuel cell system operating method according to the present invention is configured to operate the movable filter device at at least one of a point in time before the fuel cell is made to start generating electricity and a point in time before the fuel cell is made to stop generating electricity. The stopping and starting of electricity generation by the fuel cell occurs due to stopping and starting up the entire system and due to temporarily stopping and resuming operation of the fuel cell, and the movable filter device is operated in accordance with these different situations.

With a fuel cell system and an operating method thereof according to the present invention, water adhered to the filter is quickly scattered away by operating the movable filter and producing a vibration or a centrifugal force resulting from rotation. As a result, blockage of the exhaust flow passage by frozen water can be prevented and a shorter startup time can be achieved.

BRIEF DESCRIPTION OF THE DRAWINGS

Referring now to the attached drawings which form a part of this original disclosure.

FIG. 29A is a cross sectional view illustrating another example of a movable filter device that can be used in a fuel cell system according to any one of the fourth to seventh embodiments.

FIG. 29B is a top plan view of a bladed member used in the movable filter device of FIG. 29A.

DETAILED DESCRIPTION OF EMBODIMENTS

Figure 1:
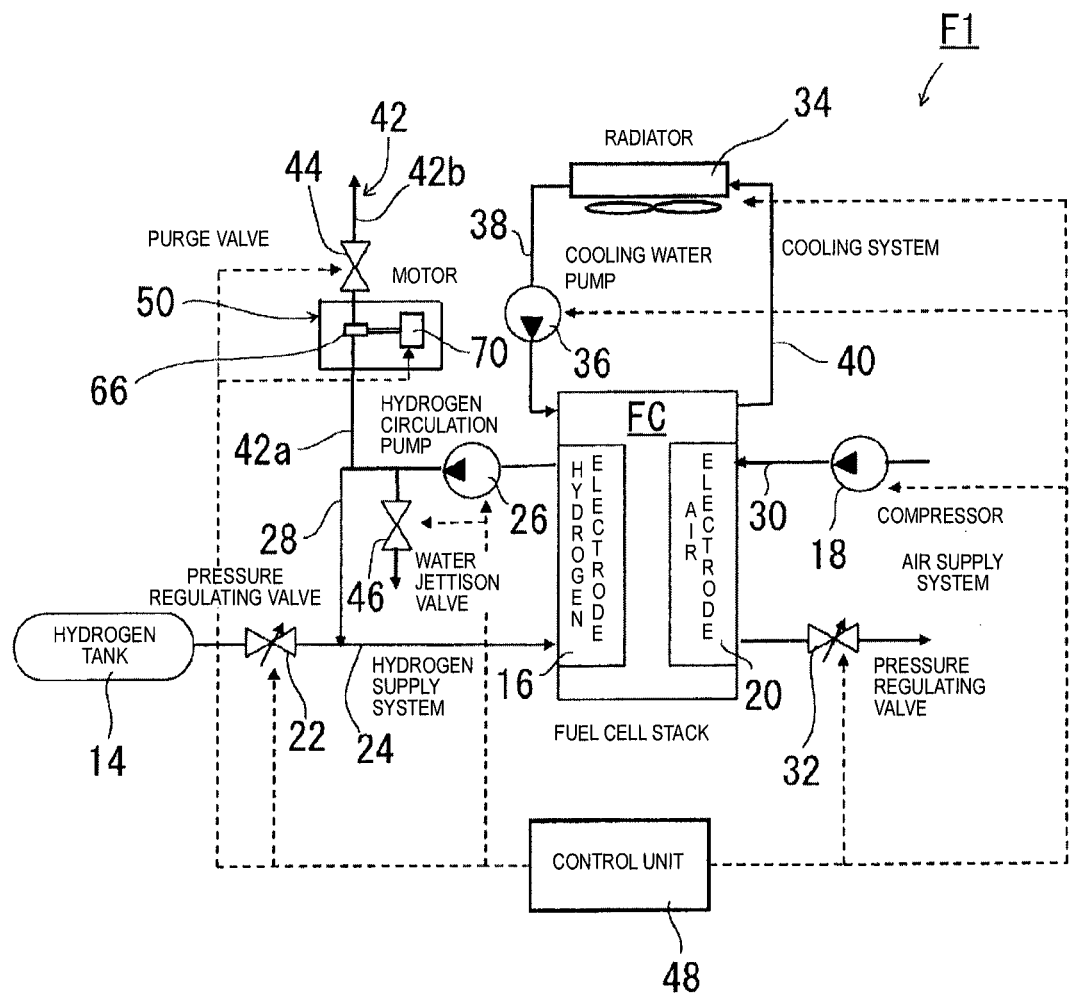
FIG. 1 is a schematic view of a fuel cell system according to a first embodiment of the present invention.

FIG. 1 is a schematic view of a fuel cell system according to a first embodiment of the present invention. The fuel cell system F1 shown in the drawing has a fuel cell FC that generates electricity from a reaction between a fuel gas and an oxidant gas. The fuel cell FC comprises, for example, a fuel cell stack made up of multiple solid macromolecular fuel cell sections stacked on one another.

The fuel cell system F1 has a hydrogen supply system that supplies hydrogen gas as a fuel gas to an anode (hydrogen electrode) 16 of the fuel cell FC and an air supply system that supplies air as an oxidant gas to the cathode (air electrode) 20 of the fuel cell FC. Although both electrodes are depicted in a schematic manner in FIG. 1, actually each of the fuel cell sections has both electrodes.

The hydrogen supply system stores the hydrogen gas serving as the fuel in a hydrogen tank 14 in a high-pressure state. High-pressure hydrogen gas is drawn from the hydrogen tank 14 and passed through a hydrogen pressure regulating valve 22 to reduce the pressure to an operating pressure of the fuel cell FC. Then, the hydrogen gas is supplied to the anode 16 through a hydrogen supply flow passage 24. Excess hydrogen gas not consumed at the anode 16 passes through a hydrogen circulating pump 26 and a hydrogen circulation flow passage 28 and is returned to the hydrogen supply flow passage 24. At the hydrogen supply flow passage 24, the re-circulated hydrogen gas mixes with hydrogen gas from the hydrogen tank 14 and is supplied to the anode 16 again.

The air supply system draws in external air to use as an oxidant gas. The air passes through an air filter (not shown) and is compressed by a compressor 18 before being supplied to the cathode 20 through an air supply flow passage 30. The oxygen in the air is used in the electricity generating reaction. Remaining air passes through an air pressure regulating valve 32 to adjust the air pressure and is discharged to the outside.

The fuel cell system F1 has a cooling system that circulates a cooling fluid (e.g., cooling water) in order to hold the operating temperature of the fuel cell FC in an appropriate range. The cooling system cools the cooling fluid with a radiator 34 and circulates the cooling fluid with a cooling water pump 36 and cooling fluid circulation flow passages 38 and 40 to cool the fuel cell FC.

The fuel cell system F1 also has an exhaust flow passage 42 that discharges fuel exhaust gas to the outside after the fuel exhaust gas is discharged from the anode (fuel electrode or hydrogen electrode) 16 of the fuel cell FC. The exhaust flow passage 42 comprises an upstream exhaust flow passage 42a that branches from the hydrogen circulation flow passage 28 and a downstream exhaust flow passage 42b having a purge valve 44 disposed at an intermediate position along the downstream exhaust flow passage 42b. A movable filter device 50 is provided between the upstream exhaust flow passage 42a and the downstream exhaust flow passage 42b.

That is, in this fuel cell system F1, the fuel exhaust gas discharged from the anode 16 of the fuel cell FC includes unreacted hydrogen gas and the concentration of nitrogen in the fuel exhaust gas gradually increases due to the permeation of air inside the fuel cell FC. Therefore, the purge valve 44 discharges the fuel exhaust gas to the outside when the nitrogen concentration becomes equal to or larger than a prescribed level. Meanwhile, water produced in the reaction is discharged to the outside through a water jettison valve 46 that branches from the hydrogen circulation flow passage 28.

The fuel cell system F1 has a control unit 48 that controls the compressor 18, the hydrogen pressure regulating valve 22, the hydrogen circulating pump 26, the air pressure regulating valve 32, the radiator 34, the cooling water pump 36, the purge valve 44, the water jettison valve 46, and the movable filter device 50.

In a fuel cell system in which the fuel exhaust gas is purged as explained above, a mesh type filter is provided to prevent foreign particles from entering the purge valve in the exhaust flow passage in order to maintain a sealing performance of the purge valve. The fuel exhaust gas has as a main component hydrogen gas that contains nitrogen and is in a damp state due to water produced in the reaction. Consequently, if moisture in the fuel exhaust gas adheres to the filter as the fuel exhaust gas passes through the mesh of the filter, then the moisture will spread over the surface of the mesh section of the filter due to surface tension. If the system is stopped in such a state and allowed to sit in a low-temperature environment, then the moisture on the surface of the mesh section of the filter will freeze and block the exhaust gas flow passage.

Therefore, in the fuel cell system F1, a movable filter device 50 is provided in the exhaust flow passage 42 through which fuel exhaust gas flows to prevent frozen moisture from blocking the exhaust flow passage 42. The movable filter device 50 comprises a filter main body 66 through which the fuel exhaust gas passes and a drive mechanism that serves to impart at least one of a rotation and a vibration to the filter main body 66. The movable filter device 50 in this embodiment is configured to impart a rotation to the filter main body 66 and the drive source of the drive mechanism is an electric motor 70.

Figure 14:
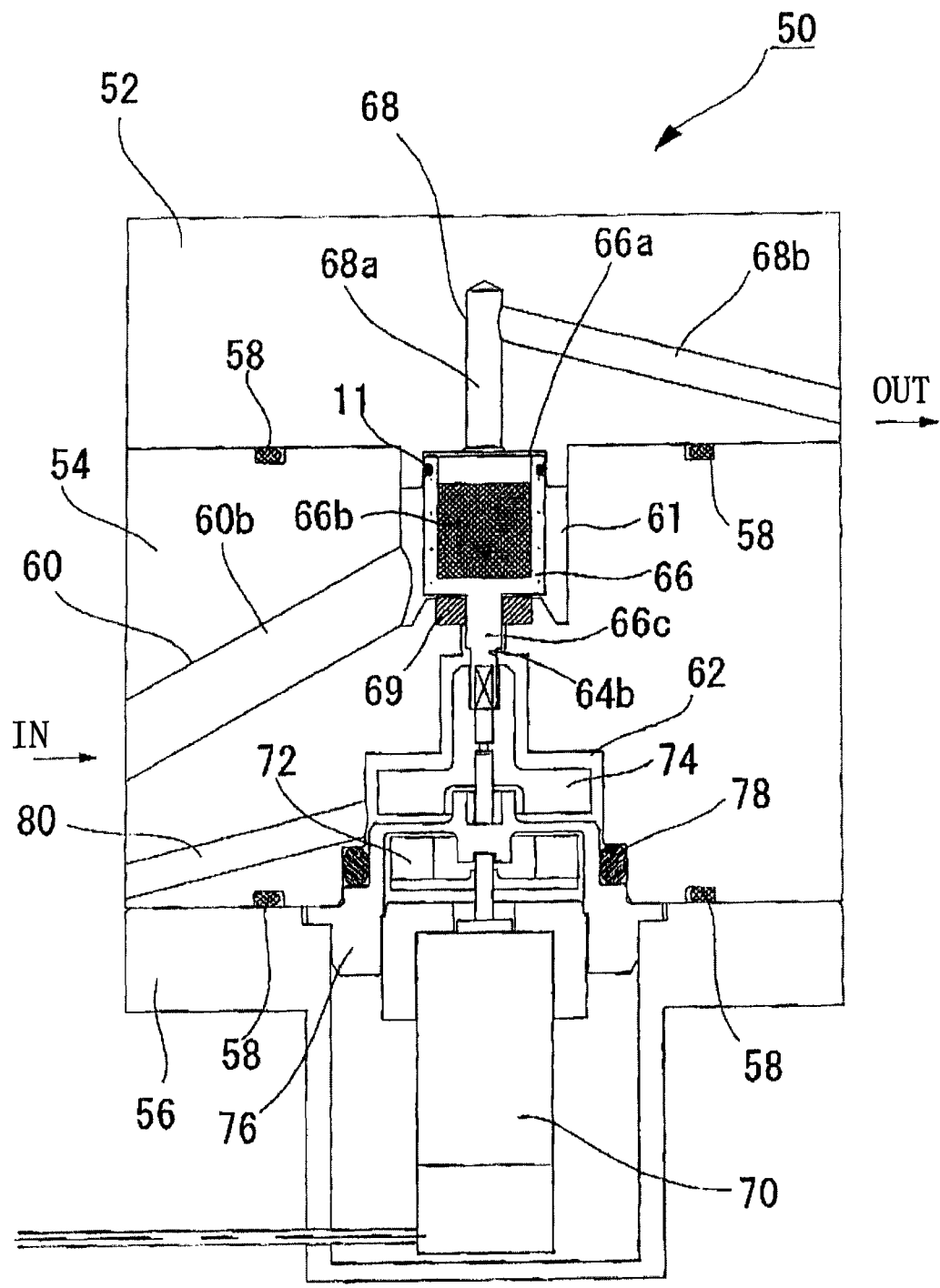
FIG. 14 is a cross sectional view explaining an example of a movable filter device that can be used in the fuel cell systems according to the first or second embodiment.

As shown in FIG. 14, the movable filter device 50 has an upper housing 52, an intermediate housing 54, and a lower housing 56. To seal between the housings, a seal member 58 is provided between the upper housing 52 and the intermediate housing 54 and a seal member 58 is provided between the intermediate housing 54 and the lower housing 56.

A fluid intake passage 60 for taking in a fluid is formed in the intermediate housing 54 and an inlet (IN) of the fluid intake passage 60 is connected to the upstream exhaust flow passage 42a shown in FIG. 1.

The fluid intake passage 60 slants upward from a lower side portion of the intermediate housing 54 and communicates with a filter chamber 61 formed in an upper central portion of the intermediate housing 54. A filter main body 66 for removing foreign particles from the fuel exhaust gas entering through the fluid intake passage 60 is housed in the filter chamber 61 such that it can rotate on a bearing 69.

Figure 15A:
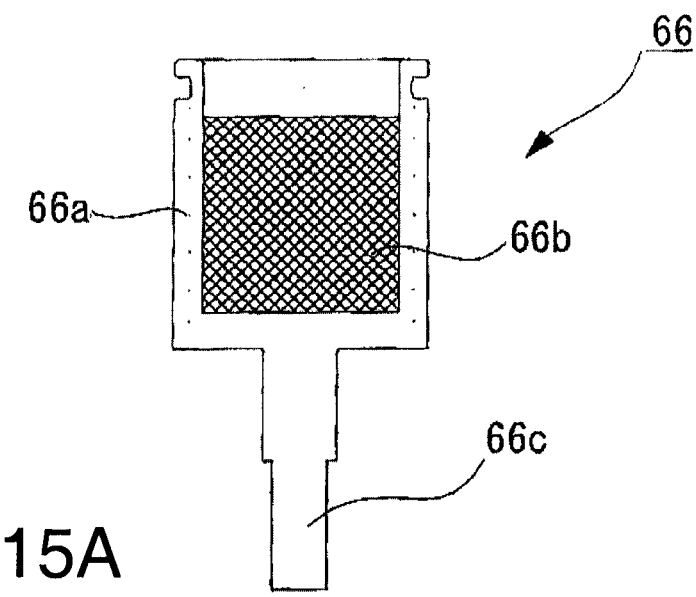
FIG. 15A is a schematic cross sectional view of a filter main body of the movable filter device shown in FIG. 14.
Figure 15B:
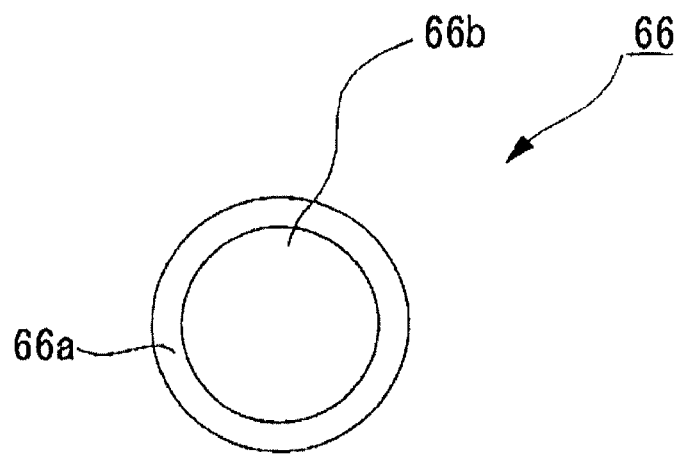
FIG. 15B is a top view of the filter main body of the movable filter device shown in FIG. 14.

As shown in FIG. 15A and 15B, the filter main body 66 comprises a generally circular-cylindrical filter section 66a, a filter member 66b made of a mesh attached to an external circumference of the filter section 66a, and an shaft section 66c that continues) downward from the filter section 66a. A seal member 11 is disposed between the filter section 66a and the upper housing 52.

The shaft section 66c of the filter main body 66 is passed through a shaft hole 64b formed below the filter chamber 61 in the intermediate housing 54 and connected to a rotation magnet 74. A fluid discharge passage 68 for discharging fuel exhaust gas passing through the filter main body 66 is formed in the upper housing 52. The fluid discharge passage 68 comprises a first fluid discharge passage 68a that extends upward from the filter chamber 61 and a second fluid discharge passage 68b that extends diagonally downward from an upper end portion of the first fluid discharge passage 68a to a side portion of the upper housing 52. The downstream discharge flow passage 42b shown in FIG. 1 is connected to an outlet (OUT) of the second fluid discharge passage 68b.

A drive mechanism housing section 62 is formed in a lower central portion of the intermediate housing 54, and the aforementioned rotation magnet 74 is rotatably arranged in the drive mechanism housing section 62 as part of the drive mechanism. Meanwhile, the motor 70 serving as the drive source of the drive mechanism is housed in the lower housing 56.

A drive magnet 72 is connected to the drive shaft of the motor 70 and a magnetic coupling is formed between the drive magnet 72 and the rotation magnet 72 connected to the shaft section 66c of the filter main body 66. As a result, operation of the motor 70 causes the filter main body 66 to rotate about a vertical axis.

A partitioning member 76 and a seal member 78 are disposed between the drive magnet 72 and the rotation magnet 74 to separate the drive mechanism housing section 62 from the motor 70 in an airtight manner. Thus, the portion through which fuel exhaust gas containing hydrogen flows and the portion where the motor 70 is arranged can be sufficiently separated from each other. As a result, a sufficient seal structure to prevent leakage of hydrogen, which has a small molecular size and tends to leak easily, can be accomplished without employing a complex seal structure. Also, the drive section of the motor 70 can be prevented from being degraded due to hydrogen contacting metal parts and causing hydrogen embrittlement.

Additionally, a leaked fluid discharge path 80 is provided in the intermediate housing 54 between the magnetic coupling region between the drive magnet 72 and the rotation magnet 74. The leaked fluid discharge path 80 connects to the fluid intake passage 60 such that, for example, fuel exhaust gas leaked from a rotating sliding portion of the filter main body 66 is circulated back to the fluid intake passage 60.

As an operating method of the fuel cell system F1 equipped with the movable filter device 50 explained heretofore, the movable filter device 50 is operated at at least one of a point in time before the fuel cell FC is made to start generating electricity and a point in time before the fuel cell is made to stop generating electricity.

The fuel cell system F1 is installed, for example, in a fuel cell automobile. Thus, there are times when stopping and starting of the electricity generation of the fuel cell FC occur due to stopping and starting up the entire system in accordance with operating circumstances of the automobile, and there are times when stopping and starting of the electricity generation of the fuel cell FC occur due to operation of the fuel cell FC being temporarily stopped and resumed (re-started up) in accordance with driving conditions of the automobile.

More specifically, when the automobile is idling while at a traffic light or traveling downhill, the operating load is small and the automobile can be operated solely with battery power. In such a situation, the generation of electricity by the fuel cell FC is temporarily stopped to reduce the amount of hydrogen consumed and improve the fuel efficiency. Since the supplies of hydrogen gas (fuel gas) and air (oxidant gas) are stopped, auxiliary devices of the hydrogen supply system and the air supply system are stopped, but the cooling system, high power electrical sections, and drive motor continue to operate off battery power. The electricity generation of fuel cell FC is resumed automatically when the battery capacity has decreased.

Therefore, the operating method is preferably configured such that when stopping and starting of the electricity generation of the fuel cell FC occur due to stopping and starting up the entire system, the movable filter device 50 is operated at least before electricity generation is stopped due to stopping the entire system.

The operating method is also preferably configured such that when stopping and starting of the electricity generation of the fuel cell FC occur due to temporary stopping and restarting the fuel cell FC, the movable filter device 50 is operated at least before electricity generation is started due to restarting the fuel cell FC.

Figure 2:
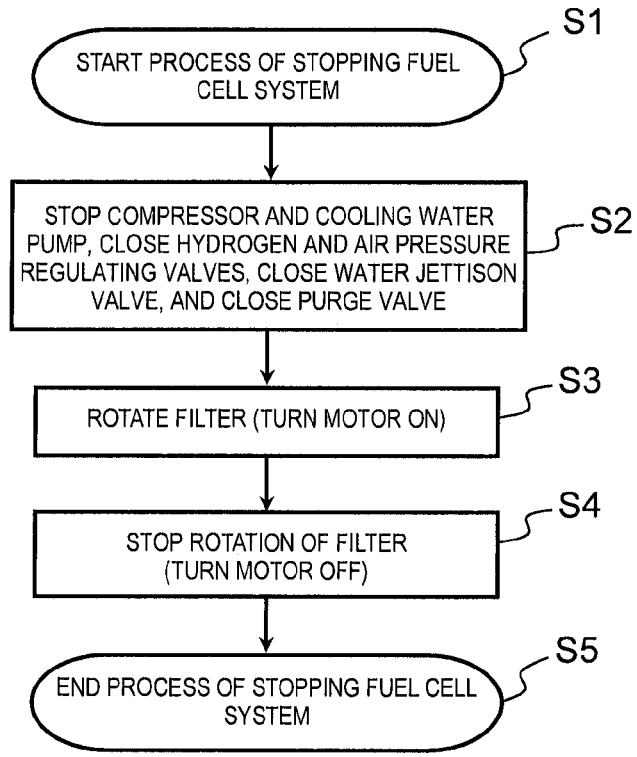
FIG. 2 is a flowchart explaining a process of stopping the fuel cell system shown in FIG. 1 according to an operating method of the system.

FIG. 2 is a flowchart explaining the process of stopping the system according to the operating method of the fuel cell system F1. This control is executed by the control unit 48.

In step S1, the process of stopping the fuel cell system F1 is started, and in step S2 the control unit 48 stops the air compressor 18 and the cooling water pump 36 and closes the hydrogen pressure regulating valve 22, the air pressure regulating valve 32, the water jettison valve 46, and the purge valve 44.

Afterwards, in step S3, the control unit 48 operates the movable filter device 50. That is, the control unit 48 drives the motor 70 and rotates the filter main body 66. As a result, water and foreign particles adhered to the filter main body 66 are scattered and quickly removed due to centrifugal force.

After a prescribed amount of time elapses, the control unit 48 proceeds to step S4 and stops the operation of the movable filter device 50. In step S5, the control unit 48 ends the process of stopping the fuel cell system F1.

In this way, the movable filter device 50 is operated to remove water and foreign particles adhered to the filter main body 66 before stopping the entire fuel cell system F1. As a result, even if the automobile is left in a low-temperature environment after stopping the system, a blockage of the exhaust flow passage 42 caused by frozen water or foreign particles clogging can be prevented, because there is substantially no water and foreign particles adhered to the filter main body 66. Thus, afterwards, the system can be started up quickly.

In the operating method according to the present invention, instead of only operating the movable filter device 50 before the entire fuel cell system F1 is stopped, it is acceptable to also operate the movable filter device 50 before starting up the entire system. In this way, condensed moisture and foreign particles that adhered to the filter main body 66 after the system was stopped can be removed quickly and a smoother system startup can be promoted.

Figure 3:
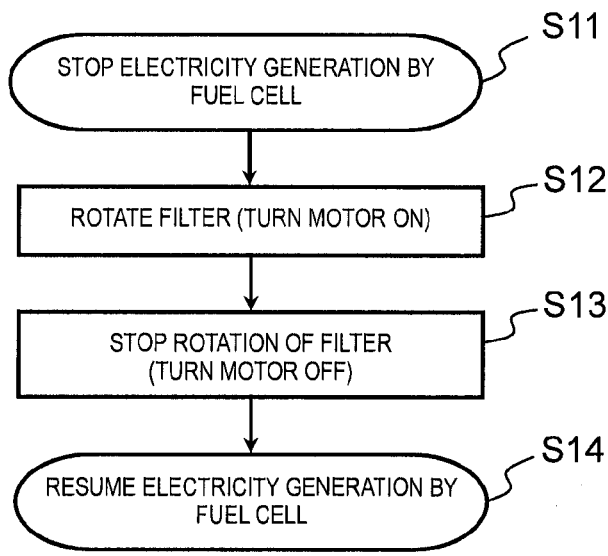
FIG. 3 is a flowchart explaining a process of resuming electricity generation by the fuel cell according to a method of operating the fuel cell system shown in FIG. 1 after temporarily stopping electricity generation.

FIG. 3 is a flow chart explaining a process of resuming electricity generation by the fuel cell FC according to the operating method of the fuel cell system F1 after temporarily stopping the electricity generation.

In step S11 the control unit 48 temporarily stops electricity generation by the fuel cell FC, and in step S12 the control unit 48 operates the movable filter device 50. That is, the control unit 48 drives the motor 70 and rotates the filter main body 66. After a prescribed amount of time elapses, the control unit 48 proceeds to step S13 and stops the operation of the movable filter device 50. In step S14, the control unit 48 resumes (restarts) electricity generation by the fuel cell FC.

With an operating method in which the movable filter device 50 is operated before resuming electricity generation by the fuel cell FC, an increased pressure loss can be prevented from occurring when gas passes through the purge valve 44 because the movable filter device 50 is not rotated while the system is operating. Also, the service life of the filter main body 66 can be maintained because the filter main body 66 is not rotated until electricity generation is resumed.

Also, there is a possibility that freezing will occur while the automobile is traveling, for example, downhill on a winter road for a long time due to cold air entering the area near the purge valve 44 while the electricity generation is stopped. However, with the operating method explained heretofore, since the movable filter device 50 is operated before the electricity generation is resumed, it is possible to prevent a situation in which moisture adhered to the filter main body 66 freezes rapidly and blocks the exhaust flow passage 42.

Moreover, by operating the movable filter device 50 before the electricity generation is resumed, foreign particles in the fuel exhaust gas and condensation occurring while the electricity generation was stopped can be removed in addition to moisture in the fuel exhaust gas.

In the operating method according to the present invention, instead of only operating the movable filter device 50 before electricity generation by the fuel cell FC is resumed, it is acceptable to also operate the movable filter device 50 before temporarily stopping the electricity generation to remove water and foreign particles adhered to the filter main body 66.

As explained previously, with the fuel cell system F1 and an operating method according to this embodiment, water and foreign particles adhered to the filter main body 66 can be scattered by operating the movable filter device 50. As a result, the exhaust flow passage 42 can be prevented from being blocked by frozen water and clogged foreign particles and the amount of time required for starting up afterwards can be shortened.

Also, with the previously explained fuel battery system F1 and operating system, the number of parts of the system can be greatly reduced because it is not necessary to provide a heater for heating the filter in the conventional manner and the entire system can be made simpler and less expensive.

With the previously explained fuel cell system F1 and operating method, since a motor 70 is used as the drive source for the drive mechanism of the movable filter device 50, the structure is simple and the filter main body 66 can be rotated at a prescribed time, e.g., for only a prescribed amount of time after the system is stopped. Thus, the service life of the drive mechanism that rotates the filter main body 66 can be lengthened.

In the previously explained fuel cell system F1 and operating method, the drive magnet 72 on the motor 70 drive shaft side and the rotation magnet 74 on the filter main body side are used to form a magnetic coupling in the movable filter device 50 because it is not permissible to arrange anything that might cause a spark to occur inside the flow passages of the hydrogen supply system. The magnetic coupling enables the motor to be sufficiently isolated from the flow passage of the hydrogen supply system. As a result, a sufficient seal structure to prevent leakage of hydrogen, which has a small molecular size and tends to leak easily, can be accomplished without employing a complex seal structure. Also, the drive section of the motor 70 can be prevented from being degraded due to hydrogen contacting metal parts and causing hydrogen embrittlement.

In the previously explained movable filter device 50, it is acceptable for one of the drive magnet 72 and the rotation magnet 74 to be made of a magnetic material. Thus, a lower cost can be promoted by using expensive magnets selectively. In particular, Neodymium magnets are known for having a strong magnetic force, but they are susceptible to damage caused by moisture and thus are not suitable to be arranged inside the flow passage of the hydrogen supply system, which contains water vapor. Instead, it is preferable to use a ferrite magnet or a magnetic material.

With the previously explained fuel cell system F1 and operating method, moisture can be guided downward due to the slanted orientations of the fluid intake passage 60 and the second fluid discharge passage 68b shown in FIG. 14. It is preferable to apply a fluoride treatment or other water repellant treatment to the filter main body 66, and the inside walls of housings 52 to 56, the fluid intake passage 60, and the fluid discharge passage 68 to make moisture flow more readily.

Figure 4:
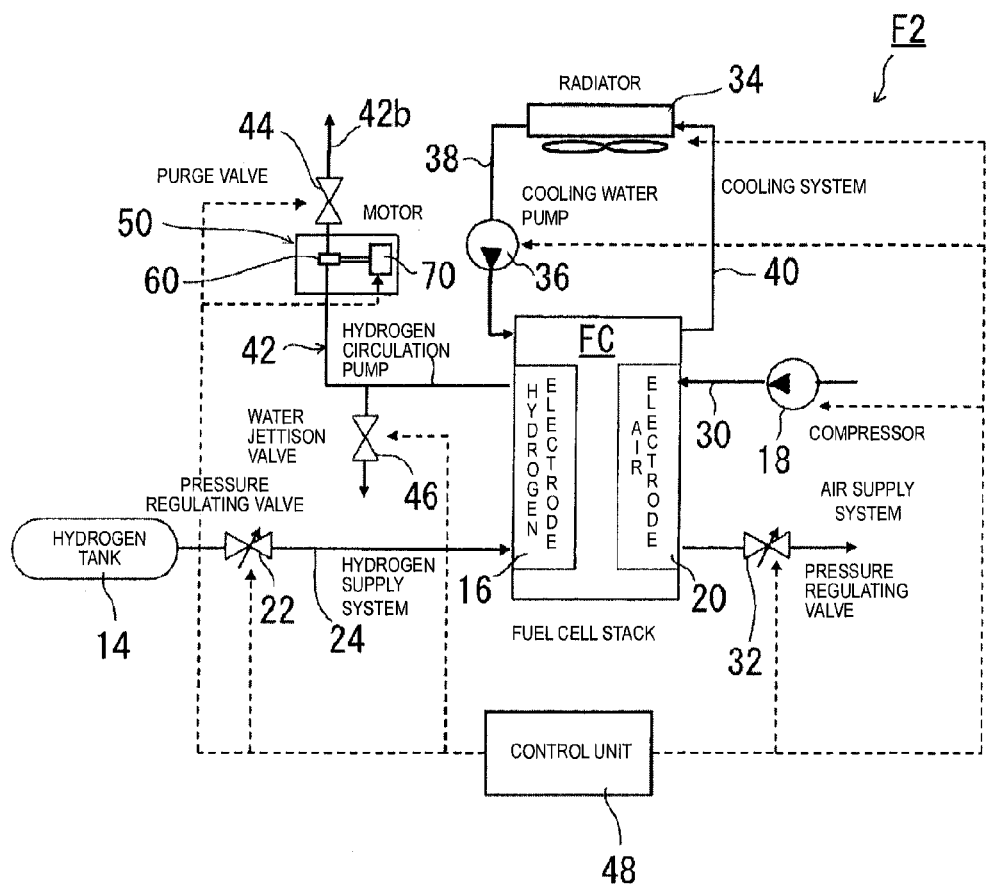
FIG. 4 is a schematic view of a fuel cell system according to a second embodiment of the present invention.

FIG. 4 is a schematic view of a fuel cell system according to a second embodiment of the present invention. Parts that are the same as the parts of the previous embodiment are indicated with the same reference numerals and detailed explanations thereof are omitted for the sake of brevity.

This fuel cell system F2 does not have the hydrogen circulation pump 26 and the hydrogen circulation flow passage 28 of the embodiment shown in FIG. 1 and is configured to discharge fuel exhaust gas from the anode 16 of the fuel cell FC directly to the upstream exhaust flow passage 42a of the exhaust flow passage 42. Consequently, the water jettison valve 46 branches from the upstream exhaust flow passage 42a. Also, similarly to the previously explained embodiment, the movable filter device 50 has a filter main body 66 and a motor 70 serving as a drive source of a rotating mechanism.

The previously explained movable filter device 50 shown in FIG. 14 can be used in the fuel cell system F2 and the constituent features and operating method of the movable filter device 50 enable the same functions and effects to be obtained.

Figure 16:
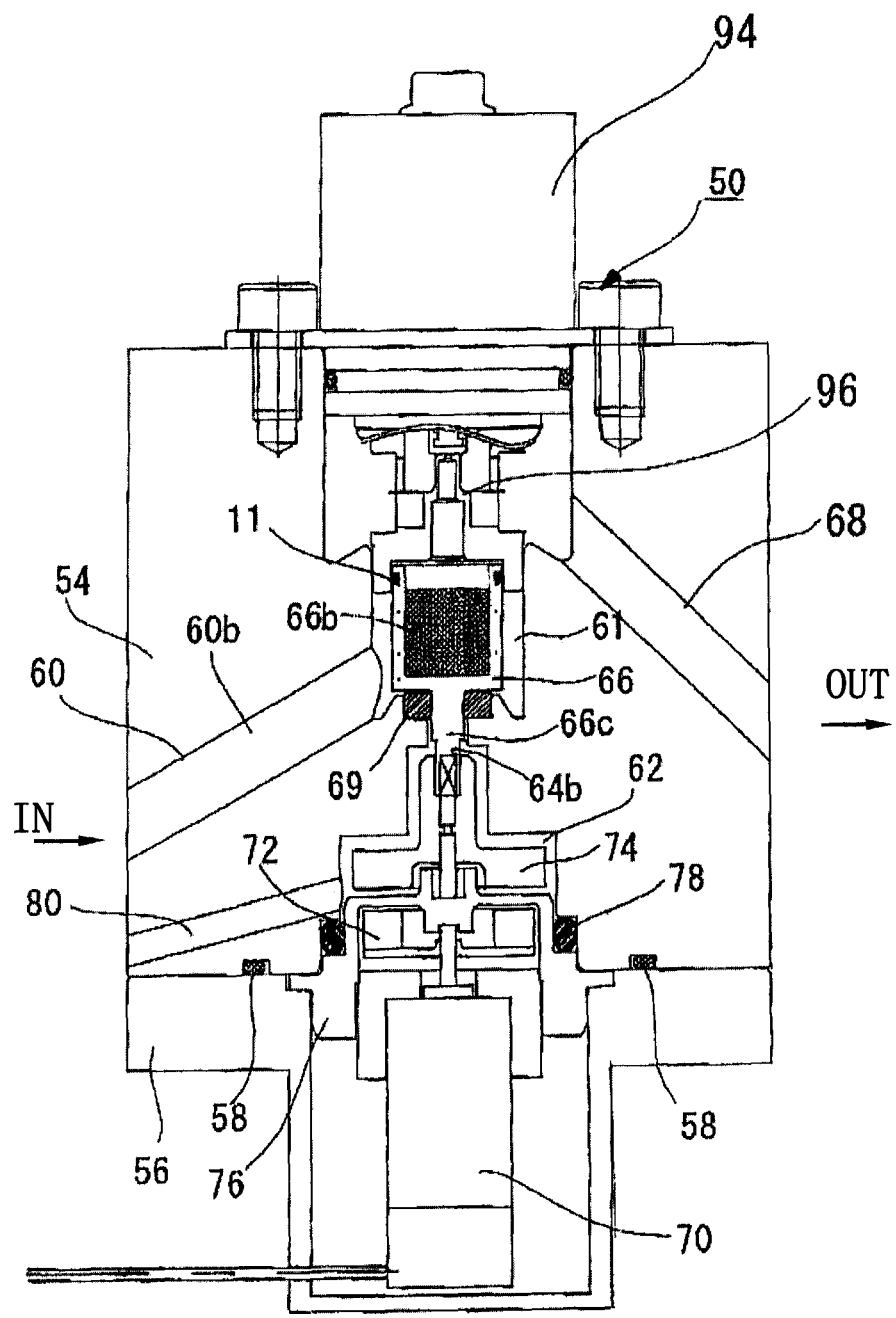
FIG. 16 is a cross sectional view illustrating another example of a movable filter device that can be used in a fuel cell system according to the first or second embodiment.

Additionally, instead of the movable filter device shown in FIG. 14, the example of a movable filter device shown in FIG. 16 can be used in both the fuel cell system F1 of the first embodiment shown in FIG. 1 and the fuel cell system F2 of the second embodiment shown in FIG. 4.

The movable filter device 50, as shown in FIG. 16, has basically the same constituent features as the movable filter device shown in FIG. 14 and FIG. 15, and it uses a drive mechanism to impart rotation to the filter main body 66. However, in this embodiment, a solenoid valve 94 functioning as a purge valve (44) is provided integrally on the filter main body 66 at the side communicating with the fluid discharge passage 68. The solenoid valve 94 opens and closes a valve port 96 to connect and disconnect communication between the fluid intake passage 60 and the fluid discharge passage 68. In this way, the piping (e.g., the downstream exhaust flow passage 42b) that would otherwise be connected to the solenoid valve 94 and part of the housing can be eliminated to make the movable valve device 50 more compact.

Figure 5:
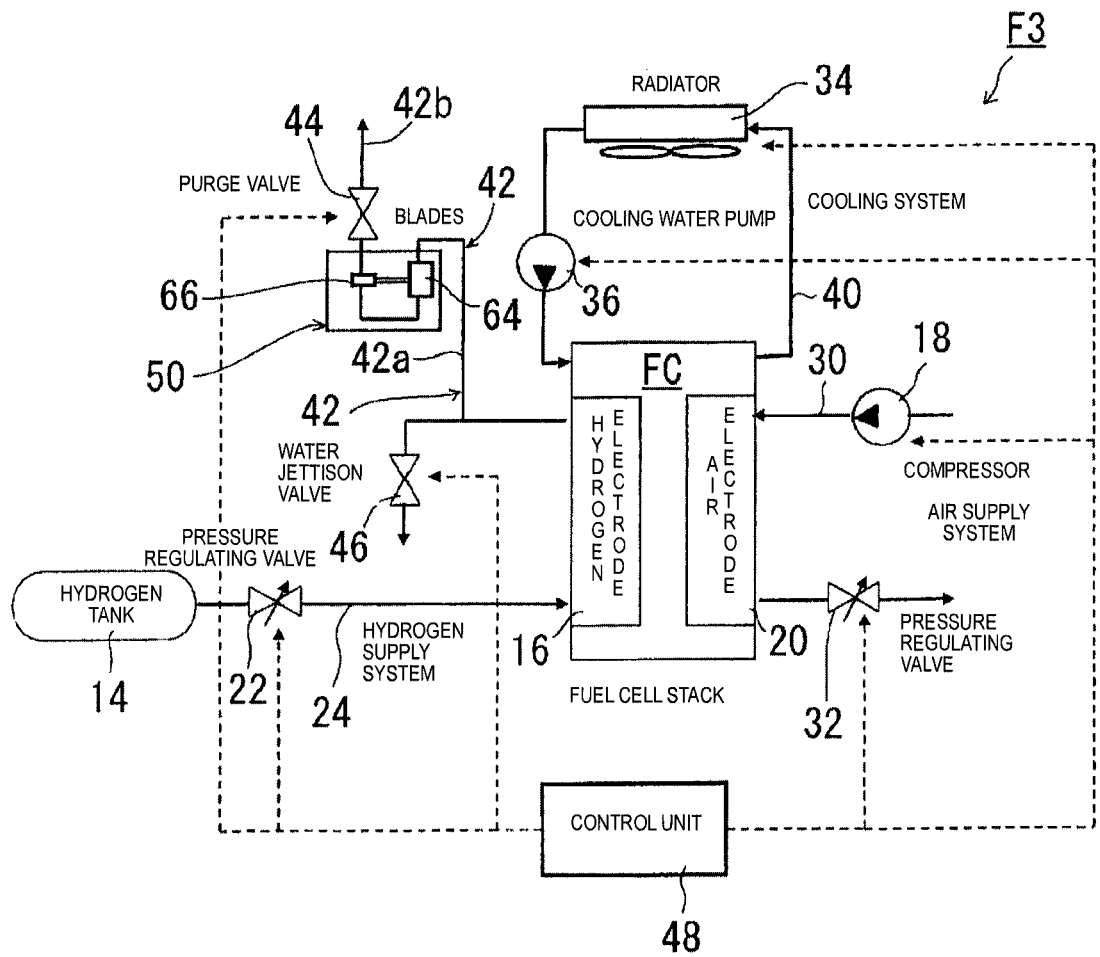
FIG. 5 is a schematic view of a fuel cell system according to a third embodiment of the present invention.

FIG. 5 is a schematic view of a fuel cell system according to a third embodiment of the present invention. Parts that are the same as the parts of the previous embodiments are indicated with the same reference numerals and detailed explanations thereof are omitted for the sake of brevity.

This fuel cell system F3 has basically the same constituent features as the embodiment shown in FIG. 4, and the movable filter device 50 has a filter main body 66 through which fuel exhaust gas passes and a drive mechanism that rotates the filter main body 66. The drive source of the drive mechanism is a fluid that flows through the system. More particularly, the fluid is the fuel exhaust gas of the fuel cell FC. The movable filter device 50 shown in FIG. 17 and FIG. 18 can be employed in this fuel cell system F3.

Figure 17:
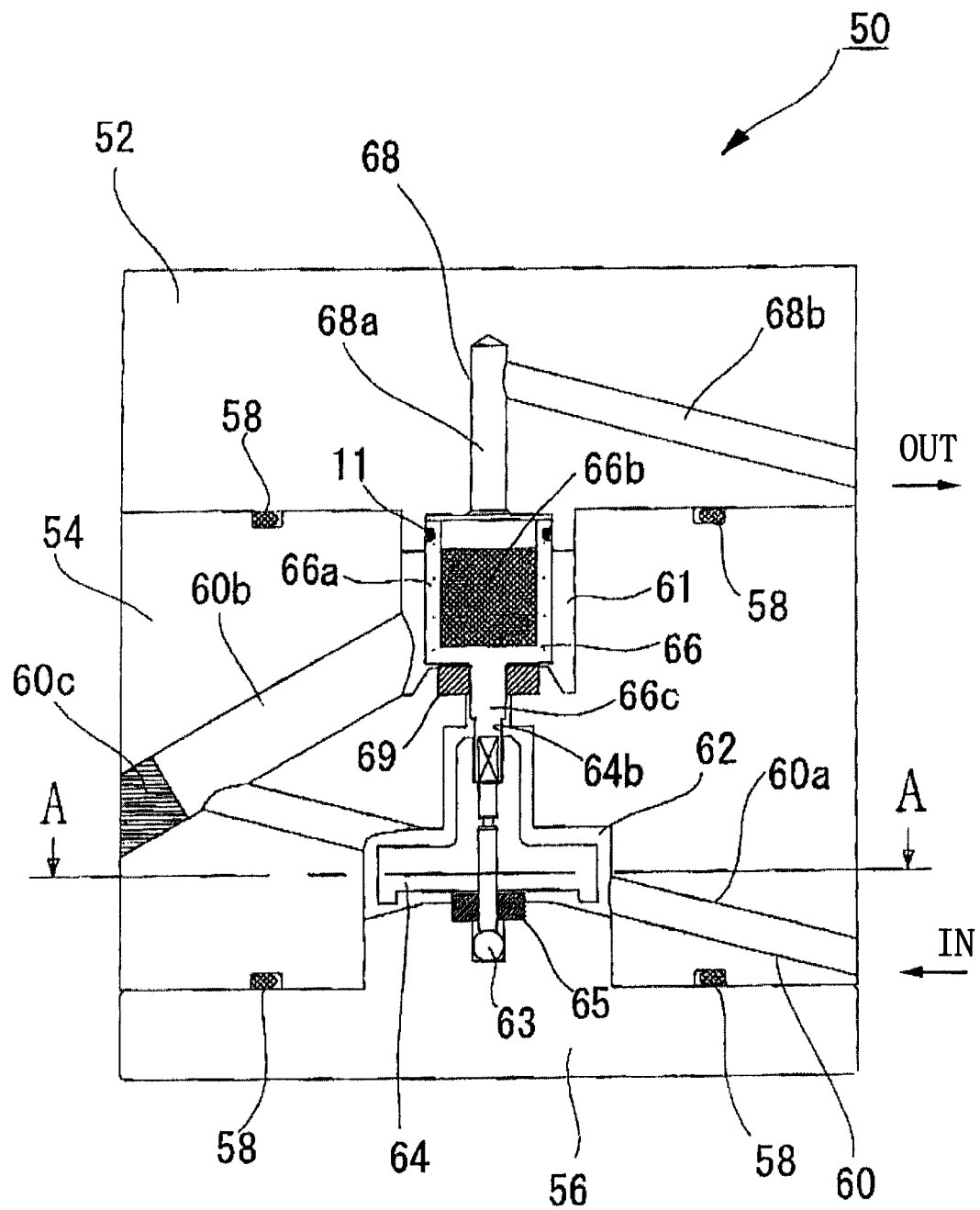
FIG. 17 is a cross sectional view illustrating an example of a movable filter device that can be used in a fuel cell system according to the third embodiment.

The movable filter device 50 shown in FIG. 17 is configured to impart a rotation to the filter main body 66 and has an upper housing 52, an intermediate housing 54, and a lower housing 56. A fluid intake passage 60 for taking in a fluid is formed in the intermediate housing 54 and an inlet (IN) of the fluid intake passage 60 is connected to the upstream exhaust flow passage 42a shown in FIG. 5.

The fluid intake passage 60 of this embodiment slants upward from a lower side portion of the intermediate housing 54 and comprises a first fluid intake passage 60a that is configured to reach a position near an opposite side portion and a second fluid intake passage 60b that bends and slants upward from a position near the opposite side portion of the intermediate housing 54. An outward side of a connecting portion between the first fluid intake passage 60a and the second fluid intake passage 60b is closed off with a sealing member 60c.

Figure 18:
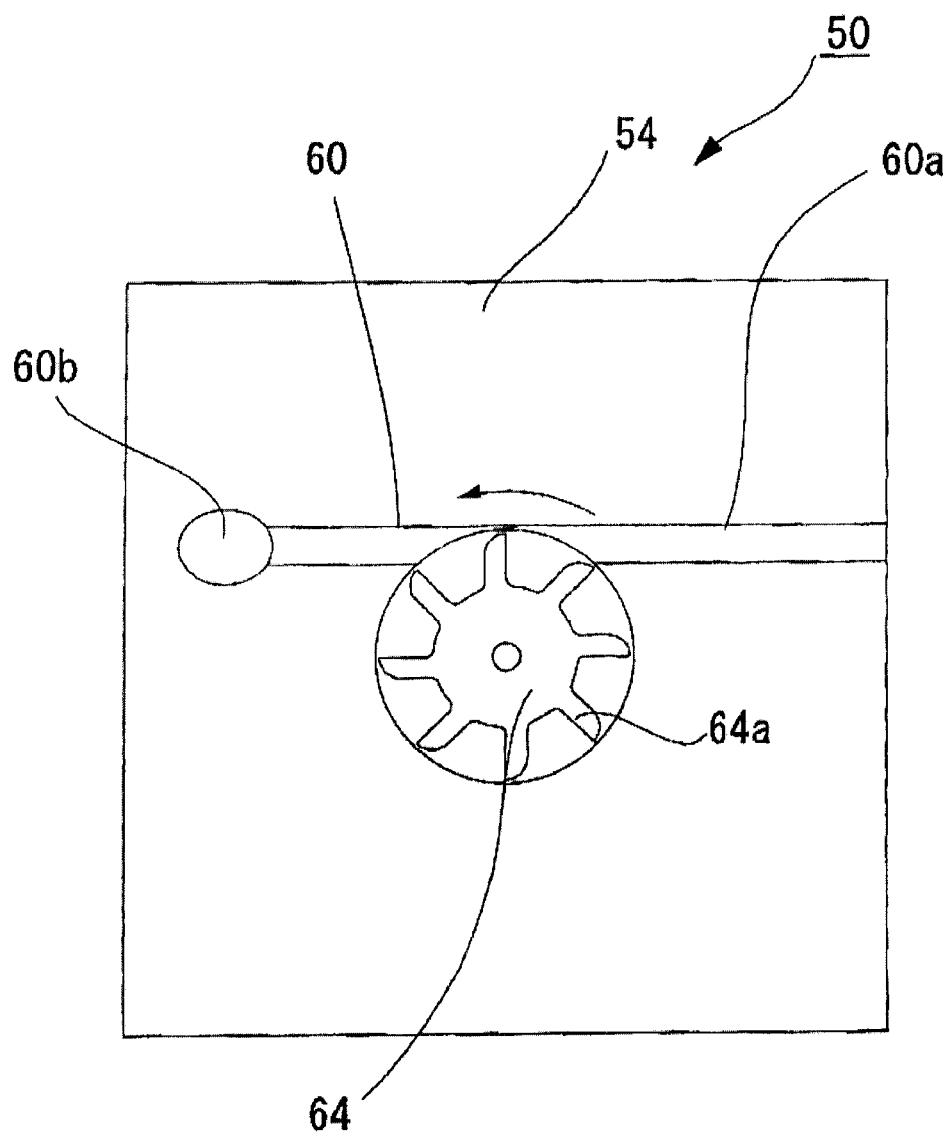
FIG. 18 is a cross sectional view based on the section line A-A of FIG. 17.

As shown in FIG. 18, a portion of the first fluid intake passage 60a is configured such that it passes through a portion of a drive mechanism housing section 62 formed in a lower central portion of the intermediate housing 54. This drive mechanism housing section 62 houses a bladed member (bladed wheel) 64 that serves a drive mechanism and is rotatably arranged on a bearing 65 and a ball 63.

The bladed member 64 has a plurality of blades arranged at equal intervals along a circular path and is rotated in the direction of the arrow shown in FIG. 18 by the pressure of fuel exhaust gas flowing into the first fluid intake passage 60a from the upstream exhaust flow passage 42a.

Meanwhile, an upper end portion of the second fluid intake passage 60b communicates with a filter chamber 61 formed in an upper central portion of the intermediate housing 54. The filter chamber 61 houses the filter main body 66, which is arranged such that it can rotate as explained previously with reference to FIG. 15.

The filter main body 66 has a shaft section 66c that fits in a shaft hole 64b formed in the center of an upper portion of the bladed member 64. Thus, the movable filter device 50 is configured such that the pressure of fuel exhaust gas flowing into the first fluid intake passage 60a from the upstream exhaust flow passage 42a rotates the bladed member 64 and the filter main body 66 rotates along with the bladed member 64.

The constituent features and operating method of the fuel cell system F3 enable the same functions and effects to be obtained as with the previously explained embodiments. A fluid flowing through the system, i.e., the fuel exhaust gas of the fuel cell FC, is used as the drive source of the drive mechanism of the movable filter 50 and, consequently, the drive source is particularly effective when the operating pressure of the fuel gas is high. That is, since it is not necessary to raise the pressure of the hydrogen system, this embodiment is well suited to a system (the system explained in the third embodiment) that does not use a hydrogen circulation pump or other device that increases the pressure and, thus, the system can be simplified further.

In a system in which the fuel gas pressure is high, when the purge valve is opened, the pressure of the fuel exhaust gas acts on the bladed member 64 simultaneously and the bladed member 64 and the filter main body 66 rotate as a unit. As a result, moisture and foreign particles adhered to the filter main body 66 are cast off the filter main body 66 by centrifugal force.

Figure 19:
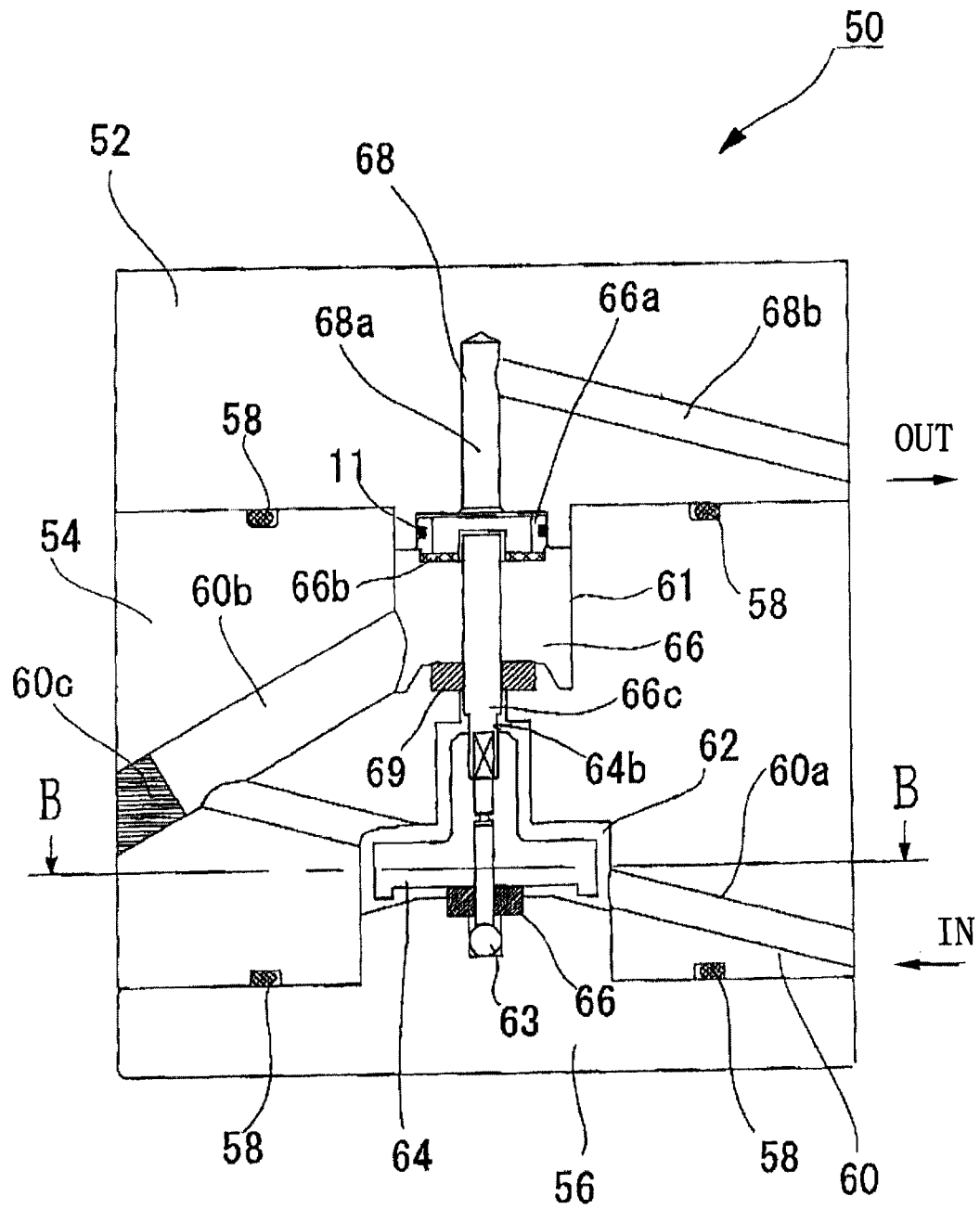
FIG. 19 is a cross sectional view illustrating another example of a movable filter device that can be used in a fuel cell system according to the third embodiment.
Figure 20:
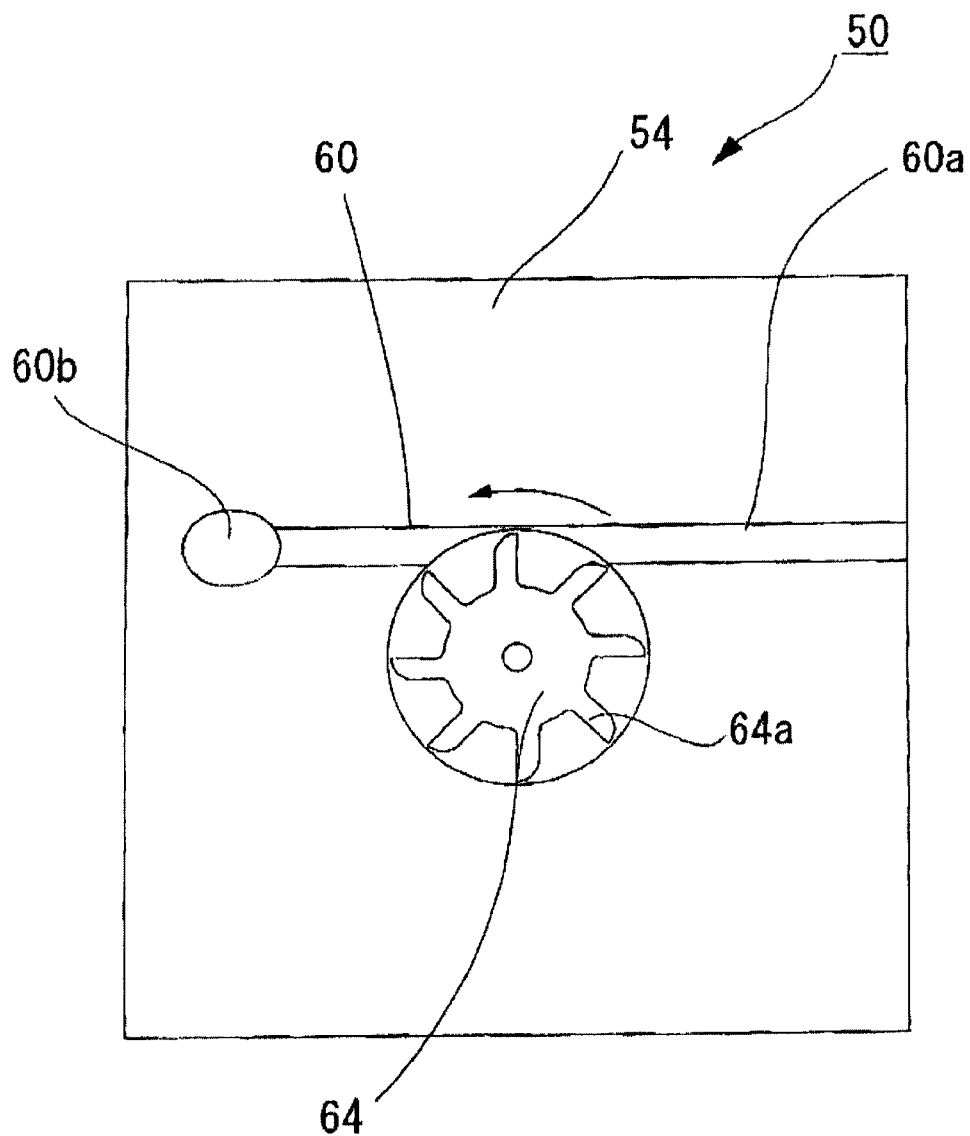
FIG. 20 is a cross sectional view based on the section line B-B of FIG. 19.
Figure 21A:
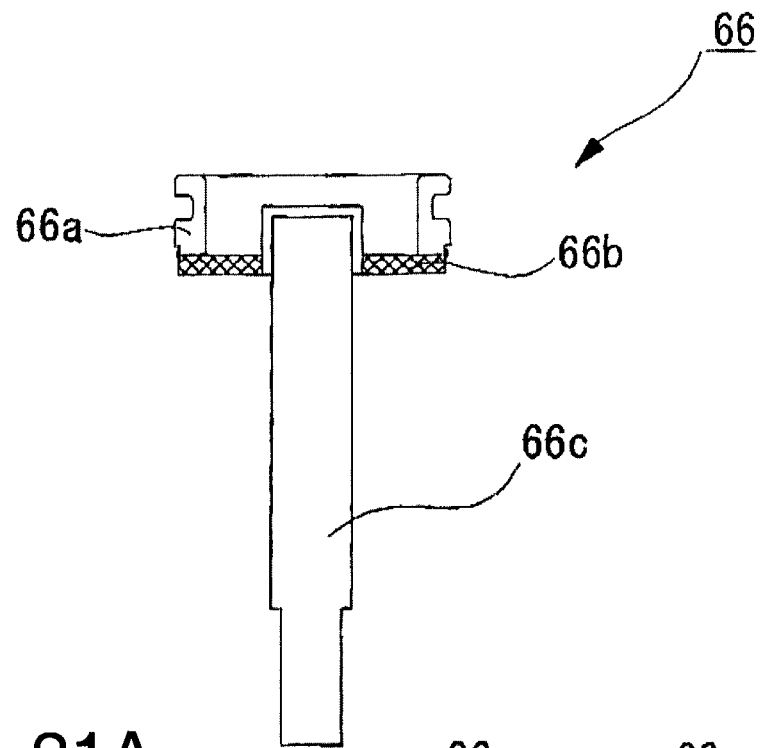
FIG. 21A is a schematic cross sectional view of a filter main body of the movable filter device shown in FIG. 20.
Figure 21B:
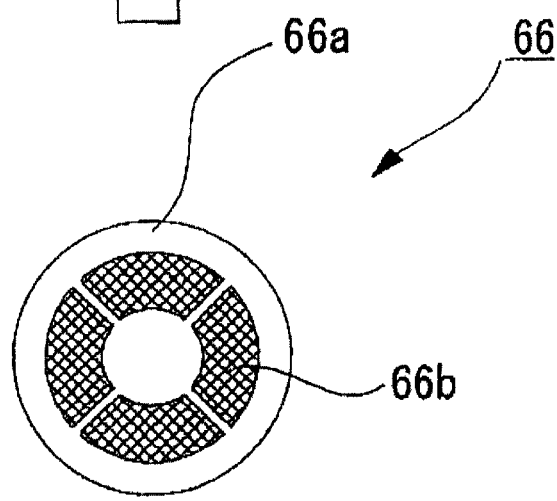
FIG. 21B is a top view of the filter main body of the movable filter device shown in FIG. 20.

Instead of using the movable filter device shown in FIG. 17, the fuel cell system F3 according to the third embodiment shown in FIG. 5 can also use the movable filter device shown in FIGS. 19 to 21.

The movable filter device 50 shown in FIG. 19 has basically the same constituent features as the movable filter device shown in FIG. 17 and it uses a drive mechanism to impart rotation to the filter main body 66. As shown in FIG. 21, the filter main body 66 of this movable filter device 50 has a circular disk-like shape. The filter main body compresses a filter section 66a and a filter member 66b made of a mesh attached to a bottom surface of the filter section 66a.

Thus, the form of the filter main body 66 can be made to have a generally circular disk-like shape as in this embodiment or to have a generally circular cylindrical shape as shown in FIG. 15 and which form to use can be determined in accordance with such design constraints as the desired filter surface area and the space available for installing the filter main body 66. As a result, the degree of design freedom is improved.

Figure 6:
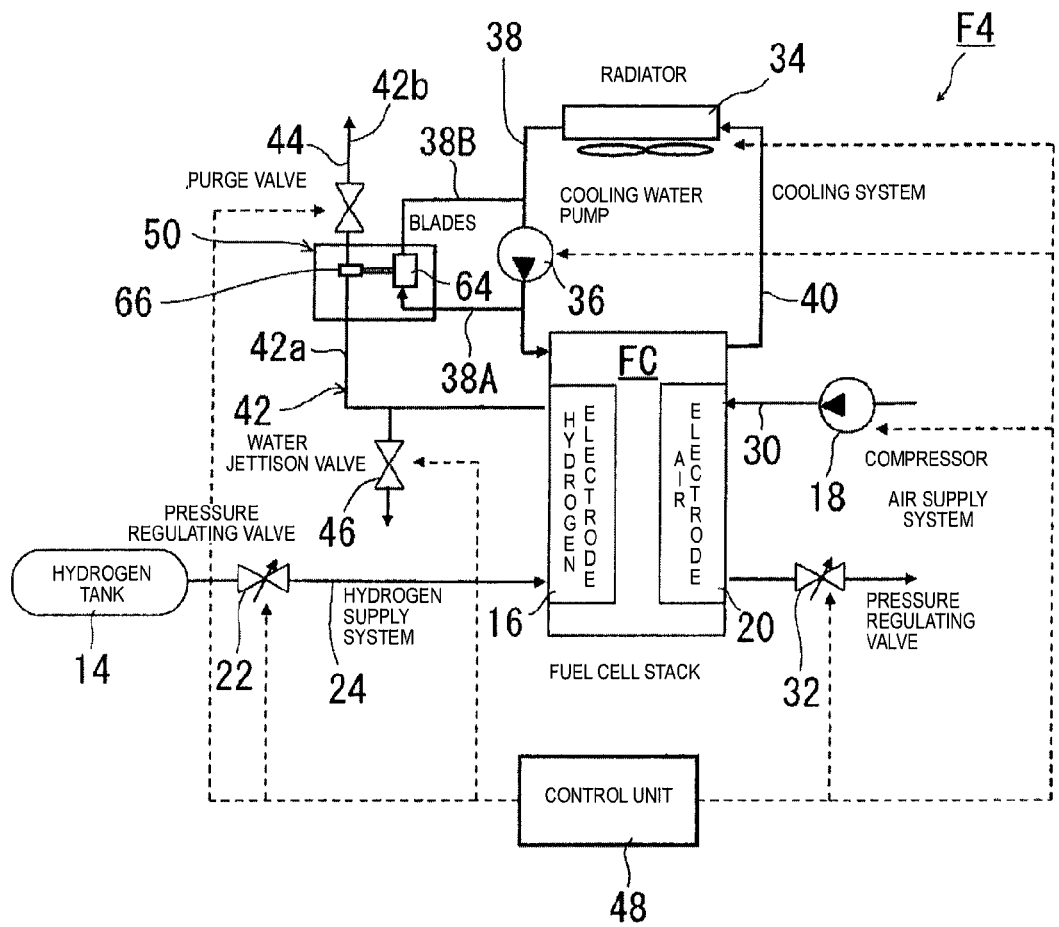
FIG. 6 is a schematic view of a fuel cell system according to a fourth embodiment of the present invention.

FIG. 6 is a schematic view of a fuel cell system according to a fourth embodiment of the present invention. Parts that are the same as the parts of the previous embodiments are indicated with the same reference numerals and detailed explanations thereof are omitted for the sake of brevity.

This fuel cell system F4 has basically the same constituent features as the embodiment shown in FIG. 4, and the movable filter device 50 has a filter main body 66 through which fuel exhaust gas passes and a drive mechanism that rotates the filter main body 66. The drive source of the drive mechanism is a fluid that flows through the system. More particularly, the fluid is a cooling fluid (cooling water) flowing through the cooling system.

In the fuel cell system F4, the coolant fluid circulation flow passage 38 includes an upstream branch flow passage 38A that branches from the coolant fluid circulation flow passage 38 on a downstream side of the cooling water pump 36 and a downstream branch flow passage 38B that connects to the coolant fluid circulation flow passage 38 on an upstream side of the coolant water pump 36. The upstream branch flow passage 38A connects to an inlet of the movable filter device 50 explained later, and the downstream branch flow passage 38B connects to an outlet of the movable filter device 50.

Figure 7:
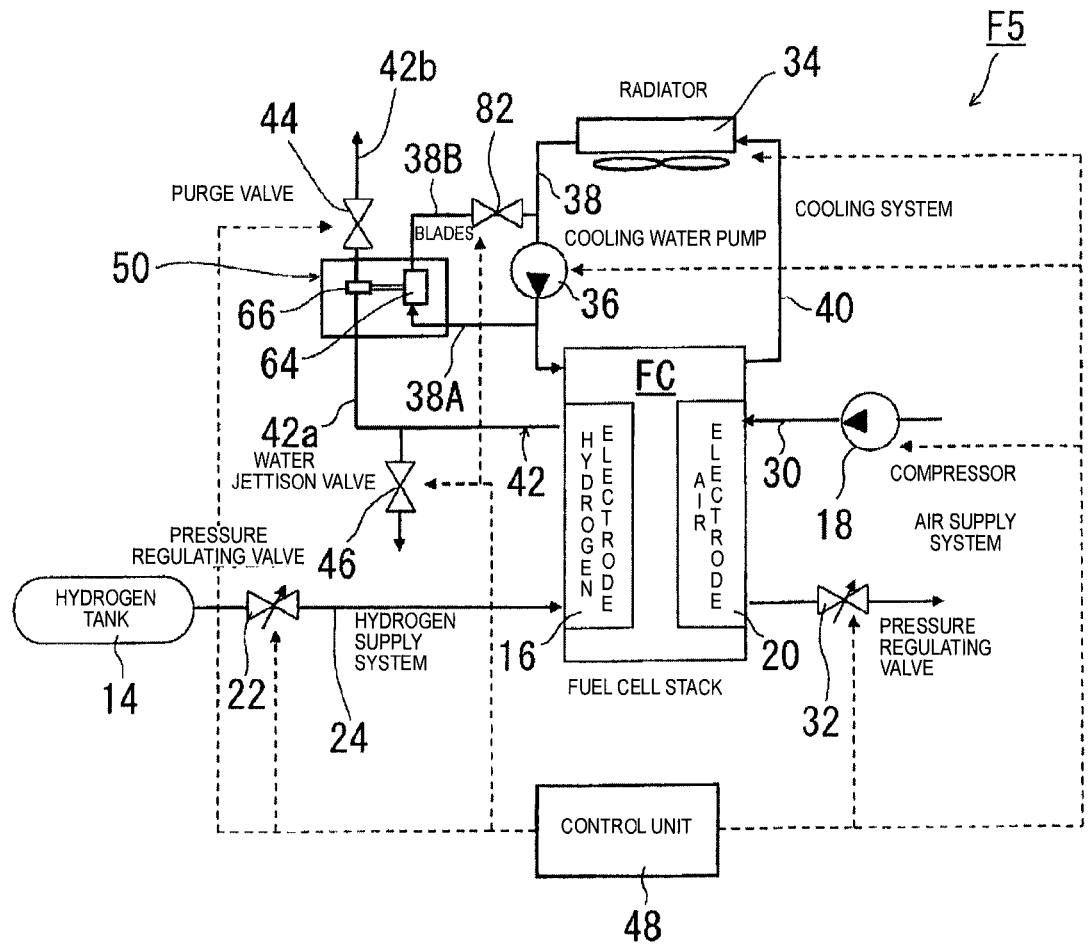
FIG. 7 is a schematic view of a fuel cell system according to a fifth embodiment of the present invention.

FIG. 7 is a schematic view of a fuel cell system according to a fifth embodiment of the present invention. This fuel cell system F5 has basically the same constituent features as the embodiment shown in FIG. 6, and the drive source of the drive mechanism of the movable filter device 50 is a cooling fluid (cooling water) introduced through a control valve 82 provided in the downstream branch flow passage 38B.

Figure 22:
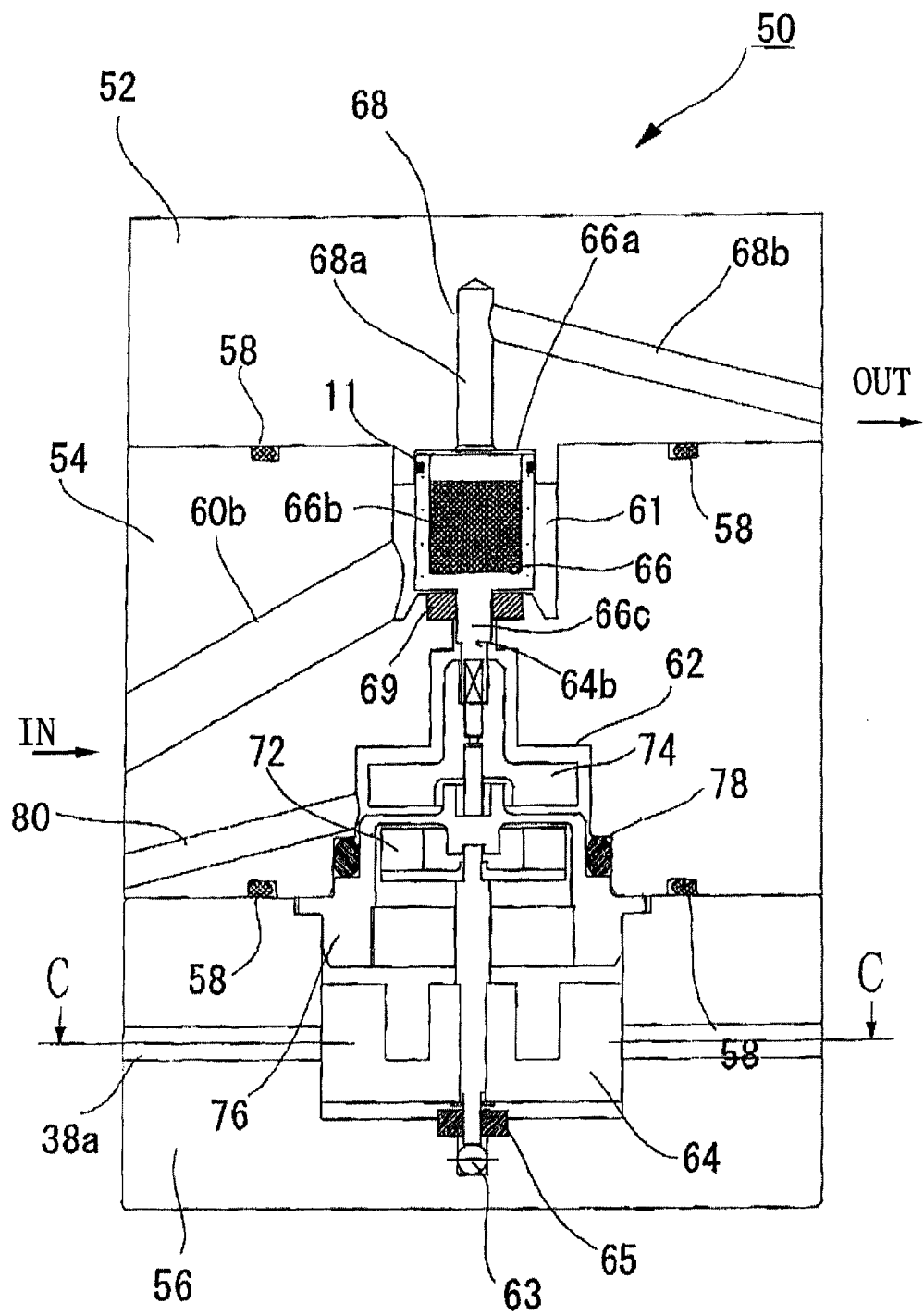
FIG. 22 is a cross sectional view illustrating an example of a movable filter device that can be used in a fuel cell system according to any one of the fourth to seventh embodiments.

It is also possible to use the movable filter device 50 shown in FIG. 22 in the fuel cell system F4 according to the fourth embodiment shown in FIG. 6 and the fuel cell system F5 according to the fifth embodiment shown in FIG. 7.

This movable filter device 50 has basically the same constituent features as that shown in FIG. 14 and the drive mechanism serves to impart a rotation to the filter main body 66. However, the motor 70 shown in FIG. 14 is replaced with a bladed member 64. The bladed member 64 of the drive mechanism is rotatably arranged on a bearing 65 and a ball 63 and housed in the lower housing 56. A fluid flow passage 38a is formed in the lower housing 56 and configured to extend from one side of the lower housing 56 to other side so as to pass through a housing portion in which the bladed member 64 is arranged. As a result, when cooling fluid flows into the fluid flow passage 38a, the pressure of the cooling liquid rotates the bladed member 64 in the direction of the arrow shown in FIG. 23A.

The movable filter device 50 has a drive magnet 72 connected to a shaft portion of the bladed member 64 and a rotation magnet 74 connected to a shaft portion 66c of the filter main body 66. The drive magnet 72 and the rotation magnet 74 form a magnetic coupling. Thus, when the bladed member 64 rotates due to the pressure of the cooling fluid, the filter main body 66 rotates as a unit with the bladed member 64. A partitioning member 76 and a seal member 78 are disposed between the drive mechanism housing section 62 and the bladed member 64 to isolate the fuel exhaust gas flow passage and the cooling fluid flow passage from each other in a sufficiently airtight manner.

Figure 23A:
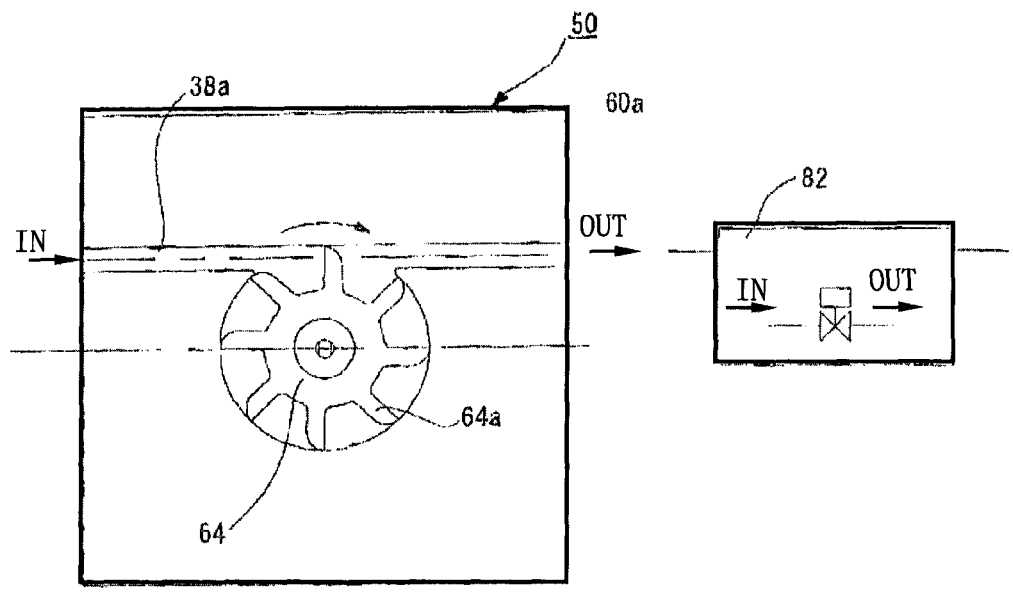
FIG. 23A is a cross sectional view showing an example of a movable filter device based on the section line C-C of FIG. 22 that can be used in a fuel cell system according to the fifth embodiment.

With the fuel cell system F5 of the embodiment shown in FIG. 7, the intake of the cooling fluid into the fluid flow passage 38a can be started and stopped by executing a control to open and close the control valve 82 shown in FIG. 23A. As a result, the bladed member 64 and the filter main body 66 can be rotated or stopped selectively.

Figure 8:
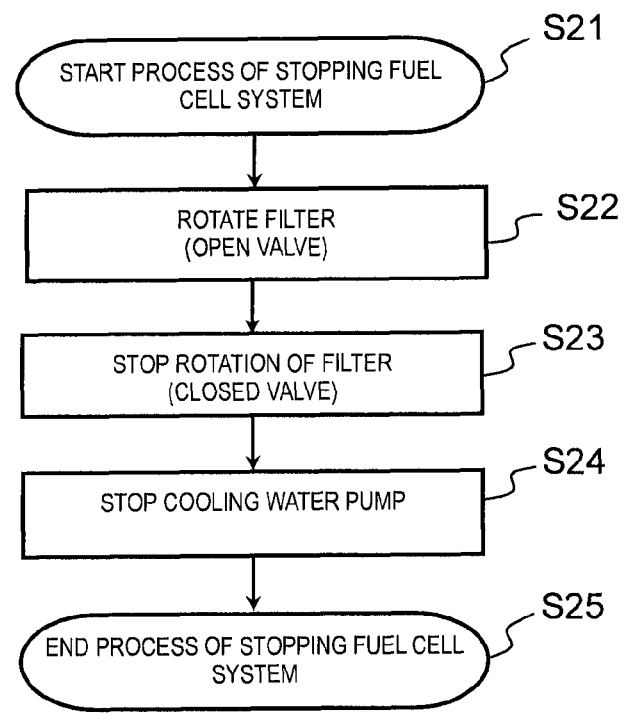
FIG. 8 is a flowchart explaining a process of stopping the fuel cell system shown in FIG. 7 according to an operating method of the system.

FIG. 8 is a flowchart explaining a process of stopping the system according to a method of operating the fuel cell system F5 shown in FIG. 7. This control is executed by the control unit 48.

In step S21, the control unit 48 starts the process of stopping the fuel cell system F5, and in step S22 the control unit 48 starts the movable filter device 50. That is, the control unit 48 opens the control valve 82 and lets the cooling fluid flow in to rotate the bladed member 64 and thereby rotate the filter main body 66. As a result, water and foreign particles adhered to the filter main body 66 are scattered and quickly removed due to centrifugal force.

After a prescribed amount of time elapses, the control unit 48 proceeds to step S23 and stops the operation of the movable filter device 50. Then, the control unit 48 stops the cooling water pump 36 in step S24 and ends the process of stopping the fuel cell system F5 in step S25.

In this way, the movable filter device 50 is operated to remove water and foreign particles adhered to the filter main body 66 before stopping the entire fuel cell system F5. As a result, even if the automobile is left in a low-temperature environment after stopping the system, a blockage of the exhaust flow passage 42 caused by frozen water or foreign particles clogging can be prevented because there are substantially no water and foreign particles adhered to the filter main body 66. Thus, afterwards, the system can be started up quickly.

In an operating method according to the present invention, similarly to the previously explained embodiments, instead of only operating the movable filter device 50 before the entire fuel cell system F5 is stopped, it is acceptable to also operate the movable filter device 50 before starting up the entire system.

Figure 9:
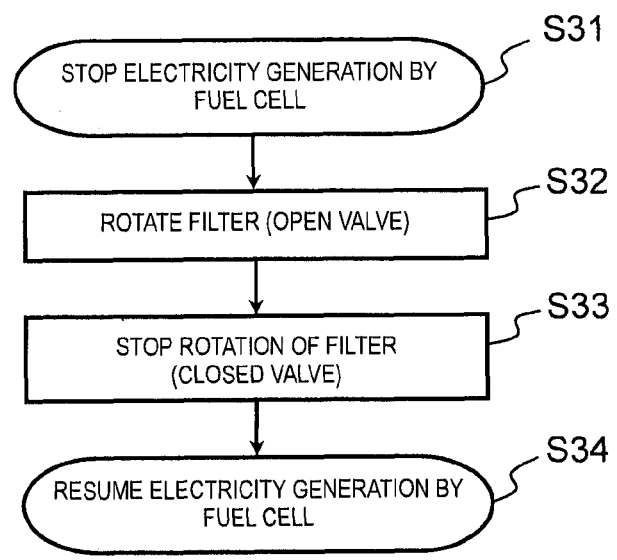
FIG. 9 is a flowchart explaining a process of resuming electricity generation by the fuel cell according to a method of operating the fuel cell system shown in FIG. 7 after temporarily stopping electricity generation.

FIG. 9 is a flowchart explaining a process of resuming electricity generation by the fuel cell FC according to a method of operating the fuel cell system F5 shown in FIG. 7 after temporarily stopping electricity generation.

In step S31 the control unit 48 temporarily stops electricity generation by the fuel cell FC, and in step S32 the control unit 48 operates the movable filter device 50. That is, the control unit 48 opens the control valve 82 and lets the cooling fluid flow in to rotate the bladed member 64 and thereby rotate the filter main body 66. After a prescribed amount of time elapses, the control unit 48 proceeds to step S33 and stops the operation of the movable filter device 50. In step S34, the control unit 48 resumes (restarts) electricity generation by the fuel cell FC.

With an operating method in which the movable filter device 50 is operated before resuming electricity generation by the fuel cell FC, similarly to the previously explained embodiments, an increased pressure loss can be prevented from occurring when gas passes through the purge valve 44 because the movable filter device 50 is not rotated while the system is operating. Also, service life of the filter main body 66 can be maintained because the filter main body 66 is not rotated until electricity generation is resumed.

The fuel cell systems F4 and F5 and the operating methods thereof enable the same functions and effects to be obtained as with the previously explained embodiments. Also, since a fluid that flows through the system is used as a drive source for the drive mechanism of the movable filter device 50 and the fluid used is the coolant fluid, these embodiments enable the cooling circuit to be utilized effectively when the system is structured such that the cooling fluid is passed through the inside of the housing to maintain the temperature. Moreover, these embodiments are well suited to systems (the systems of the fourth and fifth embodiments) that do not use a hydrogen circulation pump or other pressure increasing device and enable the systems to be simplified even further.

Figure 10:
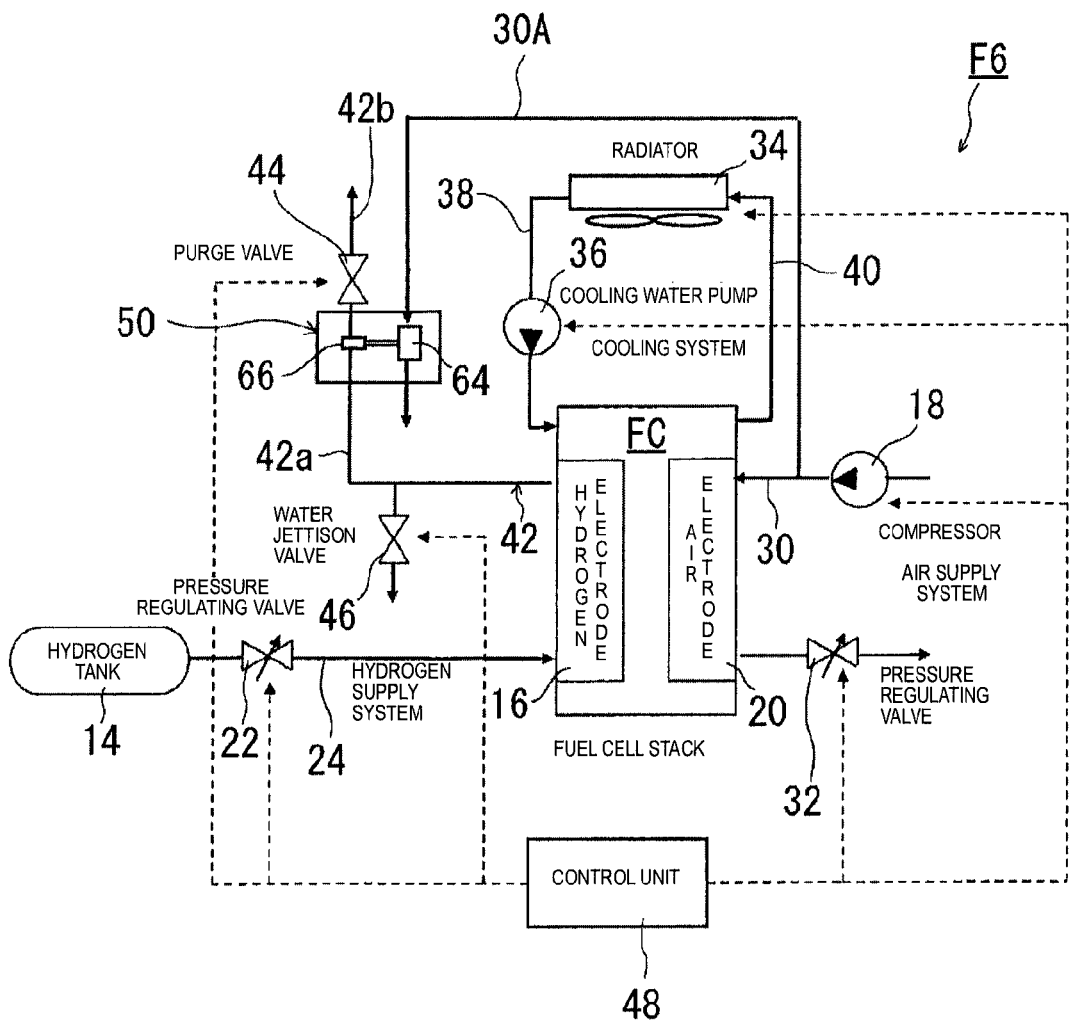
FIG. 10 is a schematic view of a fuel cell system according to a sixth embodiment of the present invention.

FIG. 10 is a schematic view of a fuel cell system according to a sixth embodiment of the present invention. Parts that are the same as the parts of the previous embodiments are indicated with the same reference numerals and detailed explanations thereof are omitted for the sake of brevity.

This fuel cell system F6 is basically the same as the embodiment shown in FIG. 4, and the movable filter device 50 has a filter main body 66 through which fuel exhaust gas passes and a drive mechanism that rotates the filter main body 66. The drive source of the drive mechanism is a fluid that flows through the system. More particularly, the fluid is the oxidant gas (air) of the fuel cell FC.

Consequently, the fuel cell system F6 has an air branch flow passage 30A that branches from the air supply flow passage 30 at a position downstream of the compressor 18. The air branch flow passage 30A is connected to an inlet of the movable filter device 50 (explained later).

Figure 11:
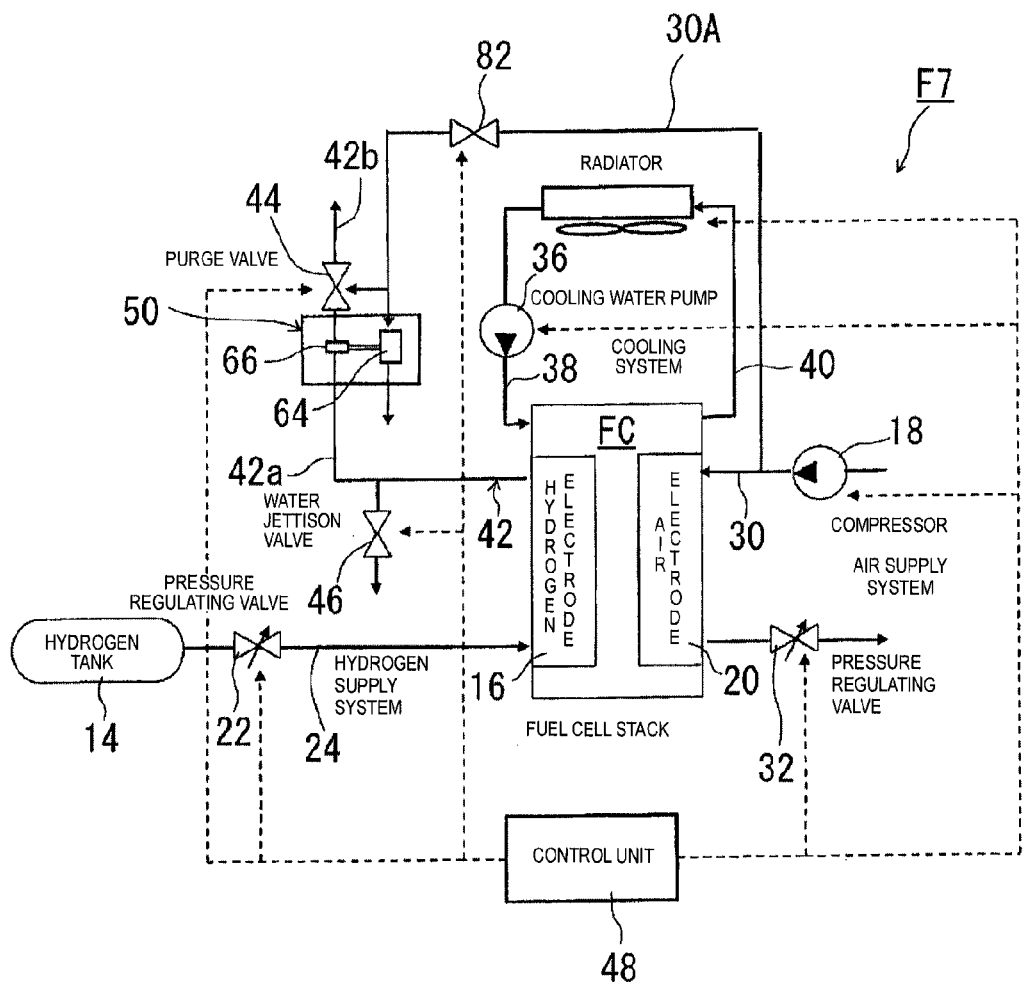
FIG. 11 is a schematic view of a fuel cell system according to a seventh embodiment of the present invention.

FIG. 11 is a schematic view of a fuel cell system according to a seventh embodiment of the present invention. The fuel cell system F7 has basically the same constituent features as the embodiment shown in FIG. 10, and the drive source of the drive mechanism of the movable filter device 50 is the oxidant gas (air), which is introduced through a control valve 82 provided in the air branch flow passage 30A.

Figure 23B:
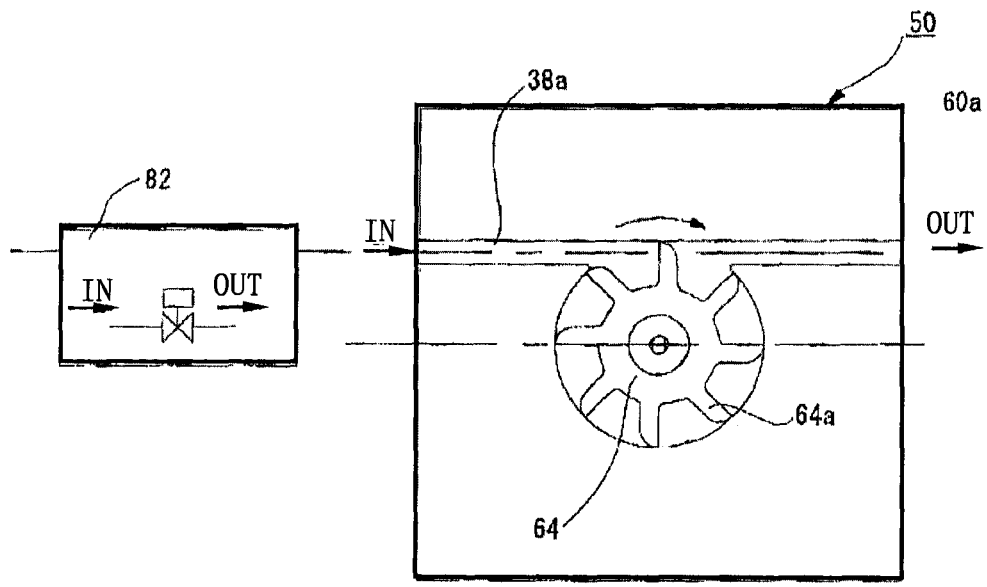
FIG. 23B is a cross sectional view showing an example of a movable filter device based on the section line C-C of FIG. 22 that can be used in a fuel cell system according to the seventh embodiment.

The fuel cell system F7 uses the filter device 50 shown in FIG. 23B. The intake of the oxidant gas (air) into the fluid flow passage 38a can be started and stopped by executing a control to open and close the control valve 82. As a result, the bladed member 64 and the filter main body 66 can be rotated or stopped selectively. The outlet side of the control valve 82 also connects to the purge valve 44 such that the oxidant gas (air) circuit can be utilized to blow away moisture in an operating portion of the purge valve 44 with the oxidant gas (air), thereby drying the operation portion of the purge valve 44 and preventing ice from developing.

Figure 12:
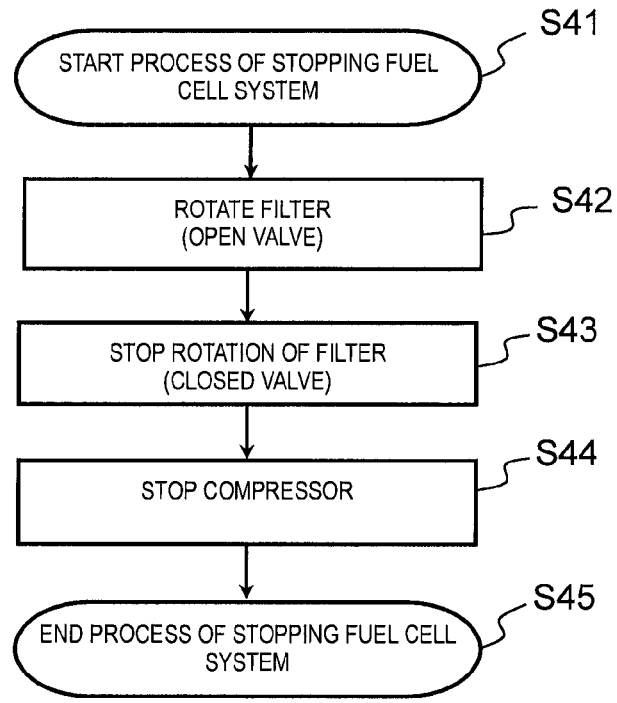
FIG. 12 is a flowchart explaining a process of stopping the fuel cell system shown in FIG. 11 according to an operating method of the system.

FIG. 12 is a flowchart explaining a process of stopping the system according to a method of operating the fuel cell system F7 shown in FIG. 11. This control is executed by the control unit 48.

In step S41, the control unit 48 starts the process of stopping the fuel cell system F7, and in step S42 the control unit 48 starts the movable filter device 50. That is, the control unit 48 opens the control valve 82 and lets air flow in to rotate the bladed member 64 and thereby rotate the filter main body 66. As a result, water and foreign particles adhered to the filter main body 66 are scattered and quickly removed due to centrifugal force.

After a prescribed amount of time elapses, the control unit 48 proceeds to step S43 and stops the operation of the movable filter device 50. Then, the control unit 48 stops the compressor 18 in step S44 and ends the process of stopping the fuel cell system F7 in step S45.

In this way, the movable filter device 50 is operated to remove water and foreign particles adhered to the filter main body 66 before stopping the entire fuel cell system F7. As a result, even if the automobile is left in a low-temperature environment after stopping the system, a blockage of the exhaust flow passage 42 caused by frozen water or foreign particles clogging can be prevented because there is substantially no water and foreign particles adhered to the filter main body 66. Thus, afterwards, the system can be started up quickly.

In an operating method according to the present invention, similarly to the previously explained embodiments, instead of only operating the movable filter device 50 before the entire fuel cell system F7 is stopped, it is acceptable to also operate the movable filter device 50 before starting up the entire system.

Figure 13:
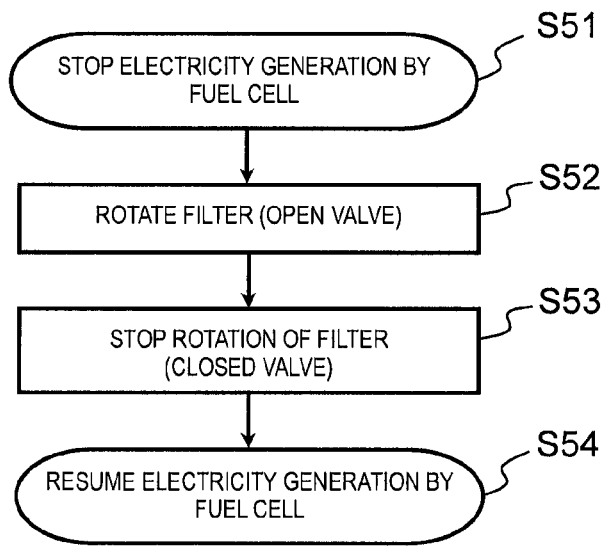
FIG. 13 is a flowchart explaining a process of resuming electricity generation by the fuel cell according to a method of operating the fuel cell system shown in FIG. 11 after temporarily stopping electricity generation.

FIG. 13 is a flowchart explaining a process of resuming electricity generation by the fuel cell FC according to a method of operating the fuel cell system F7 shown in FIG. 11 after temporarily stopping electricity generation.

In step S51 the control unit 48 temporarily stops electricity generation by the fuel cell FC, and in step S52 the control unit 48 operates the movable filter device 50. That is, the control unit 48 opens the control valve 82 and lets air flow in to rotate the bladed member 64 and thereby rotate the filter main body 66. After a prescribed amount of time elapses, the control unit 48 proceeds to step S53 and stops the operation of the movable filter device 50. In step S54, the control unit 48 resumes (restarts) electricity generation by the fuel cell FC.

With an operating method in which the movable filter device 50 is operated before resuming electricity generation by the fuel cell FC, similarly to the previously explained embodiments, an increased pressure loss can be prevented from occurring when gas passes through the purge valve 44 because the movable filter device 50 is not rotated while the system is operating. Also, service life of the filter main body 66 can be maintained because the filter main body 66 is not rotated until electricity generation is resumed.

The fuel cell systems F6 and F7 and the operating methods thereof enable the same functions and effects to be obtained as with the previously explained embodiments. Also, since a fluid that flows through the system is used as a drive source for the drive mechanism of the movable filter device 50 and the fluid used is the oxidant gas (air), these embodiments enable the air supply circuit to be utilized to blow away moisture in the drive portion with air and drive the drive portion to prevent ice from developing. Moreover, these embodiments are well suited to systems (the systems of the sixth and seventh embodiments) that do not use a hydrogen circulation pump or other pressure increasing device and enable the systems to be simplified even further.

Figure 24:
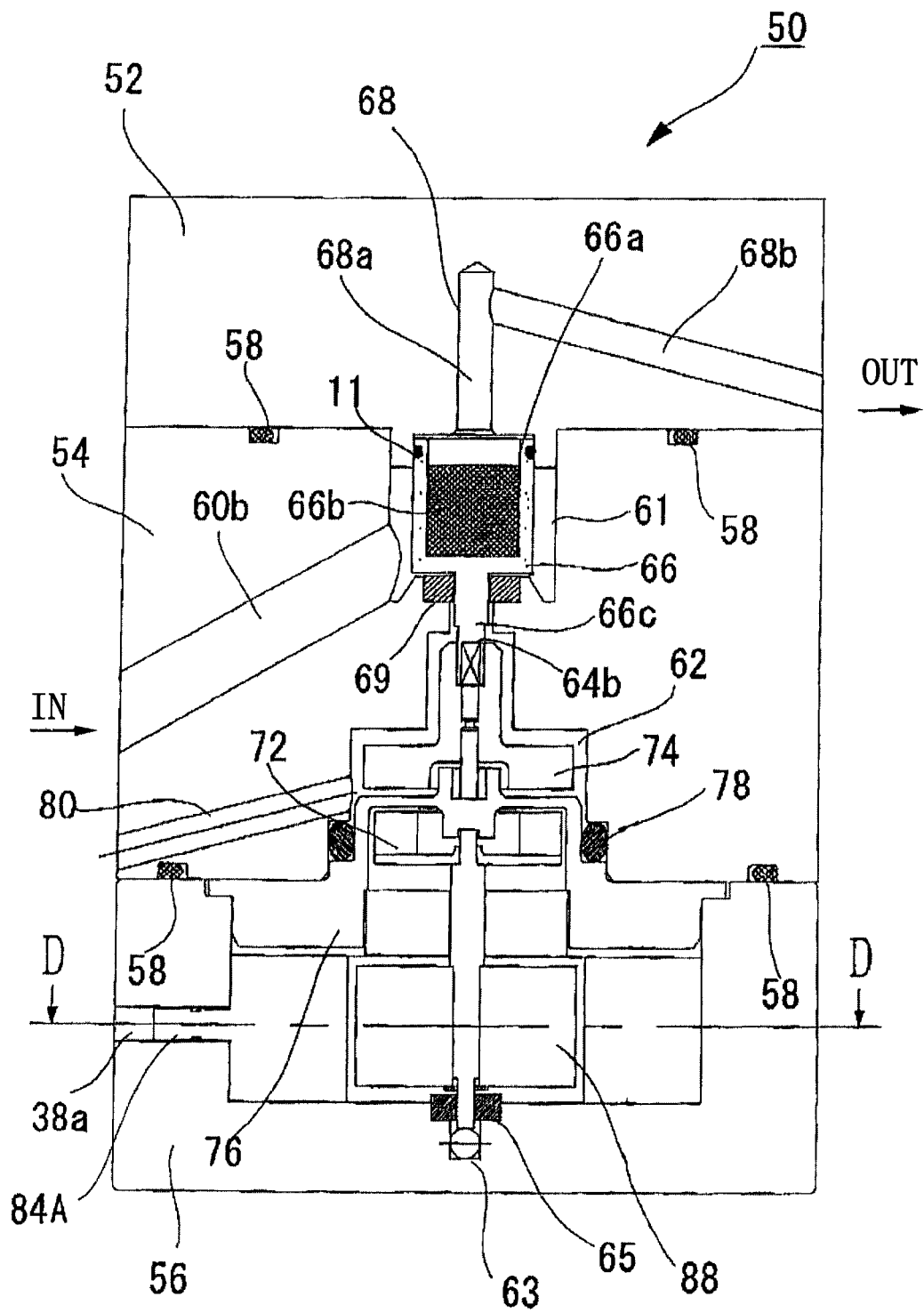
FIG. 24 is a cross sectional view illustrating an example of a movable filter device that can be used in a fuel cell system according to the sixth or seventh embodiment.
Figure 25:
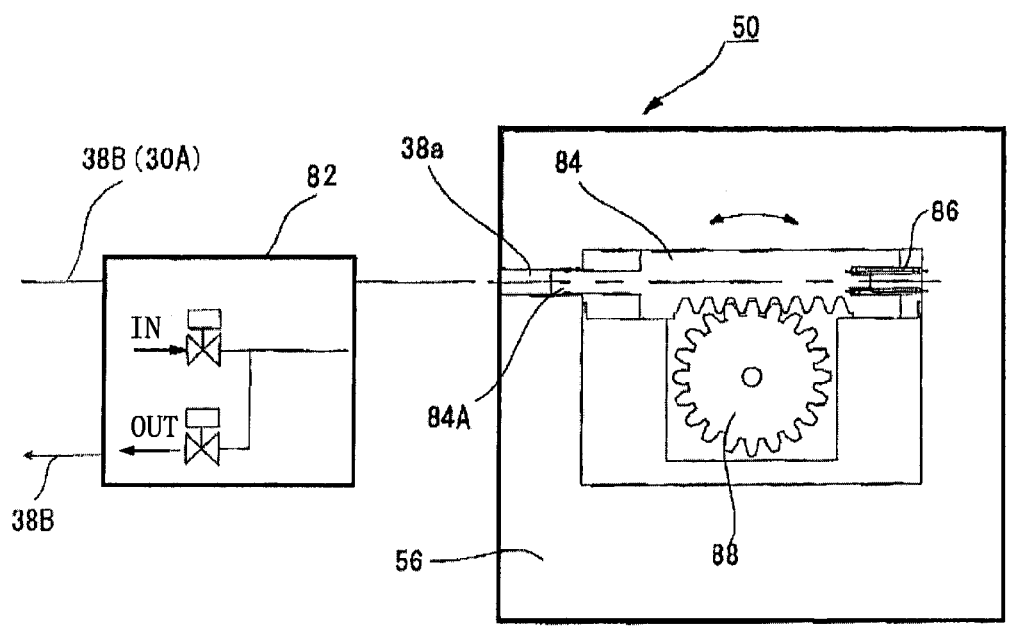
FIG. 25 is a cross sectional view based on the section line D-D of FIG. 22.

Additionally, instead of the movable filter device shown in FIG. 22, the movable filter device shown in FIG. 24 and FIG. 25 can be used in both the fuel cell system F5 of the fifth embodiment shown in FIG. 7 and the fuel cell system F7 of the seventh embodiment shown in FIG. 11.

The movable filter device 50 shown in FIG. 24 has basically the same constituent features as the movable filter device shown in FIG. 22 and it uses a drive mechanism to impart rotation to the filter main body 66. In the case of this movable filter device 50, as shown in FIG. 25, a rack member 84 and a pinion member 88 that engages with the rack member 84 are housed inside the lower housing 56 as part of the drive mechanism. A fluid flow passage 38a is formed in the lower housing 56 such that it extends from a side portion of the lower housing 56 to a space in which the drive mechanism is arranged.

The rack 84 is biased toward the fluid flow passage 38a (left side in the figure) by a spring member 86 arranged at one end of the rack member 84, and the other end of the rack 84 has a shaft section 84A that is inserted into the fluid flow passage 38a such that it can slide therein. An end face of the shaft section 84A serves as a pressure receiving surface of the rack member 84.

The movable filter device 50 has a drive magnet 72 connected to a shaft portion of the pinion member 88 and a rotation magnet 74 connected to a shaft portion 66c of the filter main body 66. The drive magnet 72 and the rotation magnet 7 form a magnetic coupling.

With this movable filter device 50, when fluid enters the fluid flow passage 38a, the pressure of the fluid acts on the end face of the shaft section 84A and moves the rack member 84. The movement of the rack member 84 causes the pinion member 88 to rotate and, simultaneously, the filter main body 66 to rotate.

In this movable filter device 50, the cooling liquid or air can be introduced into or discharged out of the fluid flow passage 38a by opening and closing a control valve 82 shown in FIG. 25. Thus, if the cooling fluid is used as the drive source of the drive mechanism, then the control valve 82 is installed in the downstream branch flow passage 38B as explained regarding the fifth embodiment shown in FIG. 7. Meanwhile, if the oxidant gas (air) is used as the drive source of the drive mechanism, then the control valve 82 is installed in the air branch flow passage 30A as explained regarding the seventh embodiment shown in FIG. 11.

With this movable filter device 50, since a cooling fluid or air flowing through the fuel cell system can be used to rotate the filter main body 66, it is not necessary to provide additional piping or an additional electric power source. Consequently, similarly to the previously explained embodiments, a fuel cell system that is less expensive, smaller, and lighter in weight can be promoted. Also, the service life of the drive mechanism of the filter main body 66 can be lengthened because a control can be executed to rotate the filter main body 66 at a prescribed time, e.g., when a certain amount of time has elapsed after the system is stopped.

FIG. 26 to FIG. 30 illustrate another example of a movable filter device that can be used in a fuel cell system according to the present invention. Parts that are the same as the parts of the previous embodiments are indicated with the same reference numerals and detailed explanations thereof are omitted for the sake of brevity.

Figure 26:
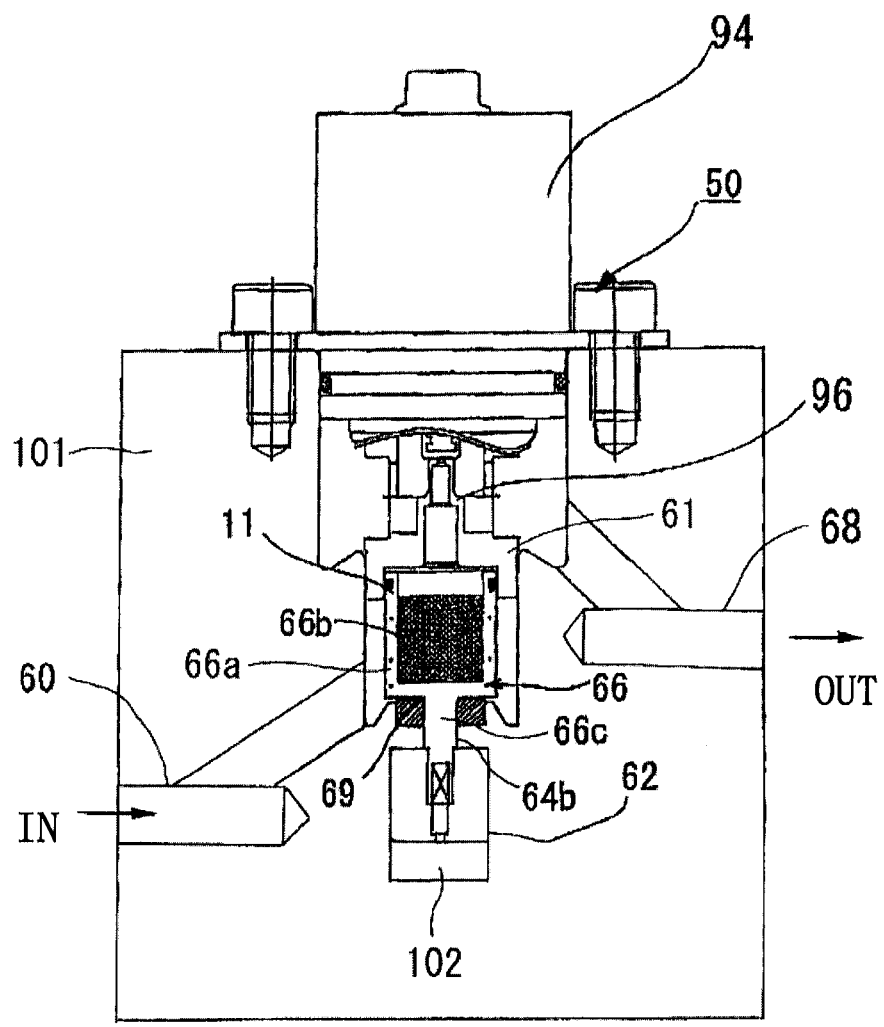
FIG. 26 is a cross sectional view illustrating another example of a movable filter device that can be used in a fuel cell system according to the first or second embodiment.

The movable filter device 50 shown in FIG. 26 can be used in the fuel cell system F1 according to the first embodiment shown in FIG. 1 and the fuel cell system F2 according to the second embodiment shown in FIG. 4 and has a drive mechanism configured to impart a vibration to the filter main body 66 instead of imparting a rotation to the filter main body as is done in the previously explained embodiments.

This movable filter device 50 includes a fluid intake passage 60, a fluid discharge passage 68, and a filter chamber 61 for housing a filter main body 66 all provided in a housing 101. A solenoid valve 94 functioning as a purge valve (44) is integrally provided on an upper portion of the housing 101. The solenoid valve 94 opens and closes a valve port 96 such that communication between the fluid intake passage 60 and the fluid discharge passage 68 is established or blocked.

Within the housing 101, the filter main body 66 is supported inside the filter chamber 61 such that 6 the filter main body 66 can move reciprocally up and down, and a drive mechanism housing section 62 is formed below the filter chamber 61 with a shaft hole 64b in-between. The filter main body 66 has a shaft section 66c that passes through the shaft hole 64b and extends into the drive mechanism housing section 62. A piezoelectric element 102 serving as a drive mechanism drive source for vibrating the filter main body 66 is housed in the drive mechanism housing section 62, and a bottom end of the shaft section 66c is connected to the piezoelectric element 102.

With this movable filter device 50, when a pulsed electric power is supplied to the piezoelectric element 102, the piezoelectric element 102 elongates and contracts with a short cycle period and causes the filter main body 66 to move reciprocally, i.e., vibrate up and down. Thus, with this movable filter device 50, water and foreign particles adhered to the filter main body 66 can be scattered and quickly removed. As a result, the exhaust flow passage can be prevented from being blocked by frozen water and the amount of time required for starting up the fuel cell system can be shortened.

Figure 27A:
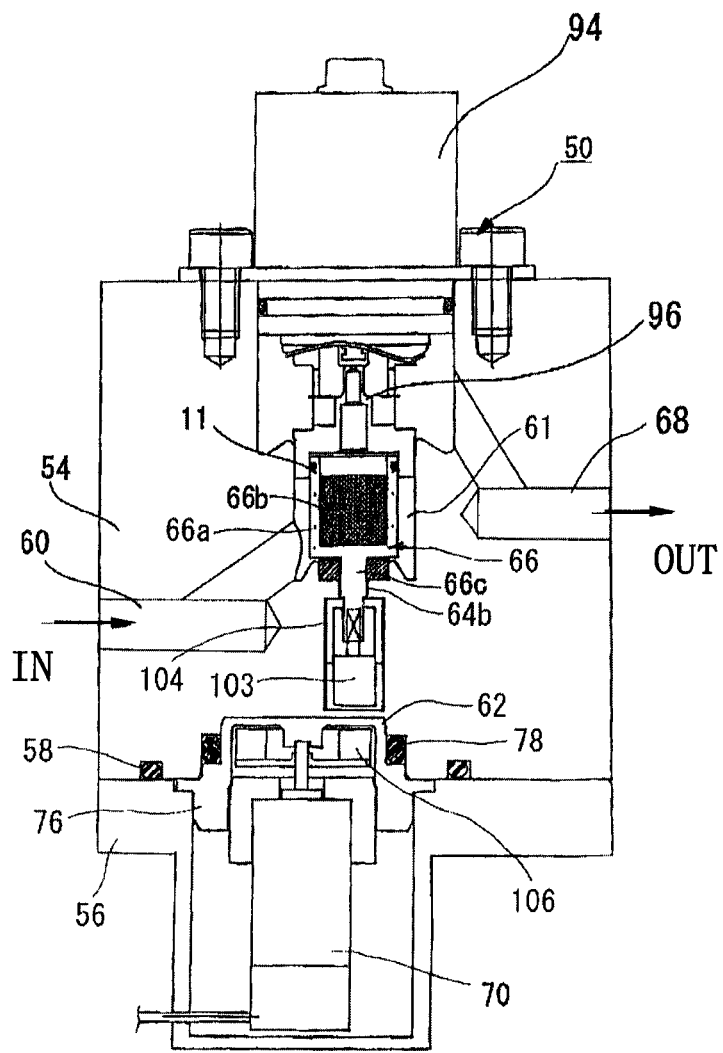
FIG. 27A is a cross sectional view illustrating another example of a movable filter device that can be used in a fuel cell system according to the first or second embodiment.
Figure 27B:
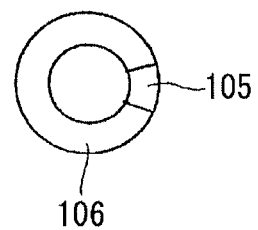
FIG. 27B is a top plan view of a drive magnet 105 of a rotating member used in the movable filter device of FIG. 27A.

The movable filter device 50 shown in FIG. 27 can be used in the fuel cell system F1 according to the first embodiment shown in FIG. 1 and the fuel cell system F2 according to the second embodiment shown in FIG. 4 and has a drive mechanism configured to impart a vibration to the filter main body 66.

The movable filter device 50 shown in FIG. 27A includes a fluid intake passage 60, a fluid discharge passage 68, a filter chamber 61 that houses a filter main body 66 such that the filter main body 66 can move reciprocally up and down, a solenoid valve (purge valve 44) 94 that opens and closes a valve port 96, and a drive mechanism housing section 62 that houses a motor 70.

A vibration magnet 103 is provided on a bottom end portion of the filter main body 66. More specifically, a magnet housing section 104 is provided below the filter chamber 61 with the shaft hole 64b in-between. The vibration magnet 103 is housed in the magnet housing section 104 such that it can move up and down. The shaft section 66C of the filter main body 66 is passed through the shaft hole 64b and a bottom end portion of the shaft section 66c is connected to the vibration magnet 103.

A rotary member 106 having a drive magnet 105 provided in one location along a circumferential section is arranged on an output shaft of the motor 70 as shown in FIG. 27. That is, the drive mechanism of the movable filter device 50 in this embodiment has a rotary member 106 that is rotationally driven and has a drive magnet 105 provided at a prescribed phase along a circumferential section of the rotary member 106.

In this movable filter device 50, the shaft section 66c of the filter main body 66 and the output shaft of the motor 70 are offset from each other and arranged such that the vibration magnet 103 faces the circumferential section of the rotary member 106 along the reciprocal movement direction (vertical direction) of the filter main body 66. The vibration magnet 103 and the drive magnet 105 are oriented such that they repel each other, i.e., such that like poles face each other.

With this movable filter device 50, when the motor 70 rotates the rotary member 106, the filter main body 66 moves upward together with the vibration magnet 103 each time the drive magnet 105 of the rotary member 106 faces opposite the vibration magnet 103 and the filter 66 moves downward when the positions of the magnets 103 and 105 deviate apart from each other. Thus, the filter main body 66 vibrates up and down as the rotary member 106 rotates. Consequently, with this movable filter device 50, water and foreign particles adhered to the filter main body 66 can be scattered and quickly removed. As a result, the exhaust flow passage can be prevented from being blocked by frozen water and the amount of time required for starting up the fuel cell system can be shortened.

Figure 28:
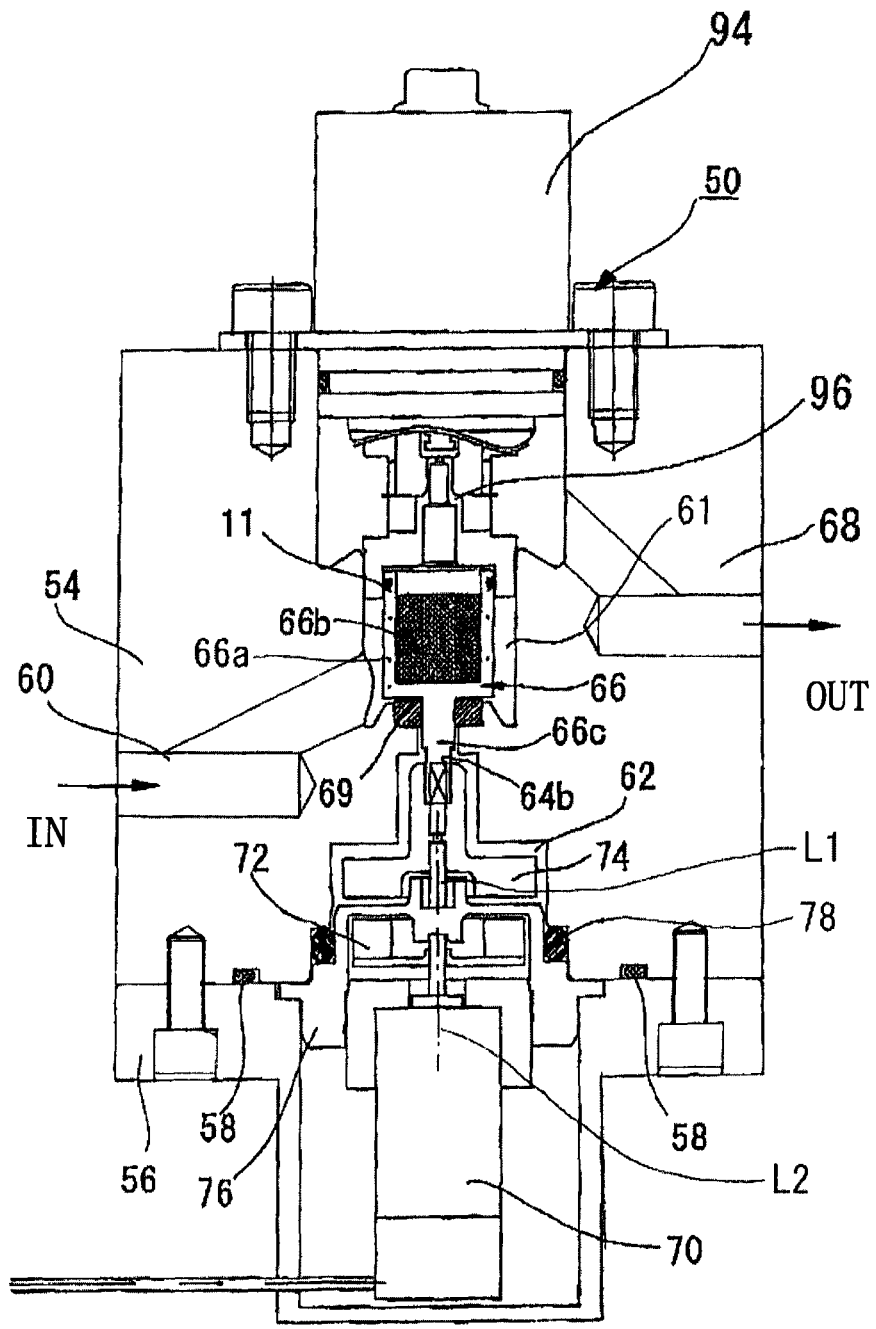
FIG. 28 is a cross sectional view illustrating another example of a movable filter device that can be used in a fuel cell system according to the first or second embodiment.

The movable filter device 50 shown in FIG. 28 can be used in the fuel cell system F1 according to the first embodiment shown in FIG. 1 and the fuel cell system F2 according to the second embodiment shown in FIG. 4 and has a drive mechanism configured to impart a rotation and a vibration to the filter main body 66 instead of imparting only a rotation or a vibration to the filter main body as is done in the previously explained embodiments.

The movable filter device 50 has basically the same constituent features as those shown in FIG. 14 and FIG. 16. The filter main body 66 is supported rotatably, and the drive mechanism includes a magnetic coupling formed by a rotation magnet 74 arranged on the filter main body 66 side and a drive magnet 72 arranged on the drive source (motor 70) side. For convenience, both members of the magnetic coupling are called "magnets" but, as explained previously, it is possible for one of the members to be made of a magnetic material.

Also, in this movable filter device 50, the rotational axis L1 of the rotation magnet 74 and the rotational axis L2 of the drive magnet 72 are arranged offset from each other. Although in the figure the rotational axes L1 and L2 appear to be coincidental, they are slightly offset from each other in a horizontal direction.

With this movable filter device 50, when the drive magnet 72 is rotated by the motor 70, the rotation magnet 74 and the filter main body 66 are also rotated and, simultaneously, the filter main body 66 is vibrated because the rotation magnet 74 rotates eccentrically with respect to the drive magnet 72.

Consequently, with this movable filter device 50, water and foreign particles adhered to the filter main body 66 can be scattered reliably and adequately removed by both a centrifugal force and a vibration resulting from the rotation. As a result, the exhaust flow passage can be prevented from being blocked by frozen water and the amount of time required for starting up the fuel cell system can be shortened.

The movable filter device 50 shown in FIG. 29A can be used in any of the fuel cell systems F4 to F7 according to the fourth to seventh embodiment shown in FIGS. 6, 7, 10, and 11 and has a drive mechanism configured to impart both a rotation and a vibration to the filter main body 66.

This movable filter device 50 has basically the same constituent features as those shown in FIG. 22 and FIG. 23. The filter main body 66 is supported rotatably, and the drive mechanism includes a magnetic coupling formed by a rotation magnet 74 arranged on the filter main body 66 side and a drive magnet 72 arranged on the drive source (bladed member 64 shown in FIG. 29B) side. Also, in this movable filter device 50, the rotational axis L1 of the rotation magnet 74 and the rotational axis L2 of the drive magnet 7 are arranged offset from each other. Although in the figure the rotational axes L1 and L2 appear to be coincidental, they are slightly offset from each other in a horizontal direction.

With this movable filter device 50, when a control valve 82 is opened, a cooling fluid or air is introduced into a fluid flow passage 38a and causes a bladed member 64 to rotate. As a result, the drive magnet 72 is rotated and the rotation magnet and the filter main body 66 are also rotated. Simultaneously, the filter main body 66 is vibrated because the rotation magnet 74 rotates eccentrically with respect to the drive magnet 72.

Consequently, with this movable filter device 50, water and foreign particles adhered to the filter main body 66 can be scattered reliably and adequately removed by both a centrifugal force and a vibration resulting from the rotation. As a result, the exhaust flow passage can be prevented from being blocked by frozen water and the amount of time required for starting up the fuel cell system can be shortened.

Figure 30A:
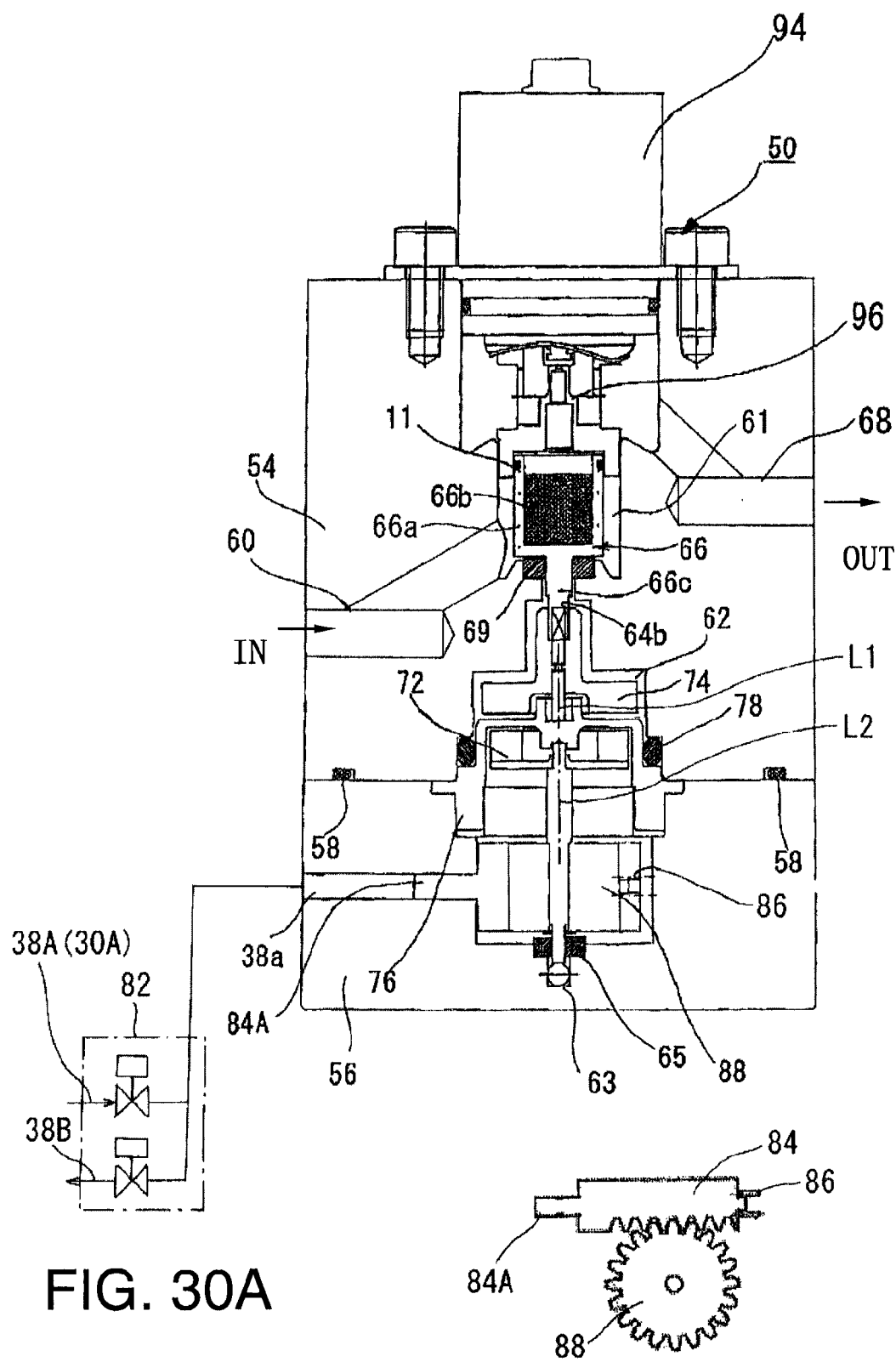
FIG. 30A is a cross sectional view illustrating still another example of a movable filter device that can be used in a fuel cell system according to any one of the fourth to seventh embodiments.
Figure 30B:
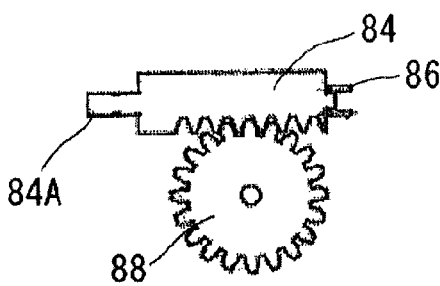
FIG. 30B is a view of a rack member and pinion member used as a drive source in the movable filter device of FIG. 30A.

The movable filter device 50 shown in FIG. 30A can be used in any of the fuel cell systems F4 to F7 according to the fourth to seventh embodiment shown in FIGS. 6, 7, 10, and 11 and has a drive mechanism configured to impart both a rotation and a vibration to the filter main body 66.

This movable filter device 50 has basically the same constituent features as those shown in FIG. 24 and FIG. 25. The filter main body 66 is supported rotatably, and the drive mechanism includes a magnetic coupling formed by a rotation magnet 74 arranged on the filter main body 66 side and a drive magnet 72 arranged on the drive source (rack member 84 and pinion member 88 shown in FIG. 30B) side. Also, in this movable filter device 50, the rotational axis L1 of the rotation magnet 74 and the rotational axis L2 of the drive magnet 72 are arranged offset from each other. Although in the figure the rotational axes L1 and L2 appear to be coincidental, they are slightly offset from each other in a horizontal direction.

With this movable filter device 50, opening and closing the control valve 82 causes a cooling fluid or air to be introduced into and discharged from the fluid flow passage 38a. As a result, the rack member 84, which is biased with a spring member 86, moves reciprocally and the pinion member 88 turns reciprocally. The drive magnet 72 rotates reciprocally with the pinion member 88, and the filter main body 66 rotates reciprocally with the rotation magnet 74. Simultaneously, the filter main body 66 vibrates because the rotation magnet 74 rotates eccentrically with respect to the drive magnet 72.

Consequently, with this movable filter device 50, water and foreign particles adhered to the filter main body 66 can be scattered reliably and adequately removed by both a centrifugal force and a vibration resulting from the rotation. As a result, the exhaust flow passage can be prevented from being blocked by frozen water and the amount of time required for starting up the fuel cell system can be shortened.

A fuel cell system and operating method according to the present invention are not limited to the constituent features of the previously explained embodiments. The details of the constituent features can be combined as necessary and appropriate, the structure of the movable filter device can be selected, and various other changes can be made without departing from the scope of the invention as defined by the claims.

The invention claimed is:

1. A fuel cell system comprising:
   a fuel cell that generates electricity with a reaction between a fuel gas and an oxidant gas;
   an exhaust flow passage that guides a fuel exhaust gas discharged from a fuel pole of the fuel cell to outside the system;
   a movable filter device arranged in the exhaust flow passage, the movable filter device comprising
      a fluid intake passage that takes in fuel exhaust gas flowing through the exhaust flow passage
      a filter main body through which fuel exhaust gas taken into the fluid intake passage flows and serves to remove foreign particles from the fuel exhaust gas,
      a fluid discharge path that discharges fuel exhaust gas that has passed through-the filter main body, and
      a drive mechanism that rotates the filter main body, and by rotating the filter main body with the drive mechanism, the movable filter device scatters moisture adhered to the filter main body toward the fluid intake passage; and
   a control unit operatively coupled to the movable filter device to control operation of the movable filter device, the control unit operating the movable filter device to scatter water on the movable filter device prior to completing shutdown of the fuel cell system during a stopping procedure of the fuel cell system, and the control unit not operating the movable filter while the fuel cell temporarily stops electric power generation.

2. The fuel cell system according to claim 1, wherein the control unit executes a control to operate the movable filter device during a resuming electric power generation procedure after temporarily stopping the fuel cell and before resuming electric power generation.

3. The fuel cell system according to claim 1, wherein the movable filter device comprises a filter main body through which the fuel exhaust gas passes, and a drive mechanism that imparts at least one of a rotation and a vibration to the filter main body.

4. The fuel cell system according to claim 1, wherein the drive mechanism is a motor that rotates the filter main body.

5. A fuel cell system comprising:
a fuel cell that generates electricity with a reaction between a fuel gas and an oxidant gas;
an exhaust flow passage that guides a fuel exhaust gas discharged from a fuel pole of the fuel cell to outside the system;
a movable filter device arranged in the exhaust flow passage, the movable filter device comprising a fluid intake passage that takes in fuel exhaust gas flowing through the exhaust flow passage, a rotatably supported filter main body through which fuel exhaust gas taken into the fluid intake passage flows and which serves to remove foreign particles from the fuel exhaust gas, a fluid discharge path that discharges fuel exhaust gas that has passed through the filter main body, and a drive mechanism that rotates the filter main body, and by rotating the filter main body with the drive mechanism, the movable filter device scatters moisture adhered to the filter main body toward the fluid intake passage, the drive mechanism including a magnetic coupling comprising a rotation magnet on a filter main body side and a drive magnet on a drive source side, the rotational axis of the rotation magnet and the rotational axis of a rotary shaft being arranged offset from each other; and
a control unit operatively coupled to the movable filter device to control operation of the movable filter device, the control unit operating the movable filter device prior to completing shutdown of the fuel cell system during a stopping procedure of the fuel cell system, and the control unit not operating the movable filter while the fuel cell temporarily stops electric power generation.

6. The fuel cell system according to claim 3, wherein
the filter main body is supported to move reciprocally, and
the drive mechanism includes a piezoelectric element that vibrates the filter main body.

7. A fuel cell system comprising:
a fuel cell that generates electricity with a reaction between a fuel gas and an oxidant gas;
an exhaust flow passage that guides a fuel exhaust gas discharged from a fuel pole of the fuel cell to outside the system;
a movable filter device arranged in the exhaust flow passage, the movable filter device comprising a filter main body through which the fuel exhaust gas passes, and a drive mechanism that imparts at least one of a rotation and a vibration to the filter main body, the filter main body having a vibration magnet, and is supported such that it can move reciprocally, the drive mechanism having a rotary member that is rotationally driven, and having a drive magnet provided at a prescribed phase along a circumferential section of the rotary member, the vibration magnet and the circumferential section of the rotary member being arranged to face each other along the reciprocal movement direction of the filter main body, and the vibration magnet and the drive magnet being oriented such that the vibration magnet and the drive magnet repel each other; and
a control unit operatively coupled to the movable filter device to control operation of the movable filter device, the control unit operating the movable filter device prior to completing shutdown of the fuel cell system during a stopping procedure of the fuel cell system, and the control unit not operating the movable filter while the fuel cell temporarily stops electric power generation.

8. The fuel cell system according to claim 1, wherein
a drive source of the drive mechanism is a fluid that flows through the fuel cell system.

9. The fuel cell system according to claim 8, wherein
the fluid is a fuel exhaust gas of the fuel cell.

10. The fuel cell system according to claim 8, wherein
the fluid is a cooling fluid for cooling the fuel cell.

11. The fuel cell system according to claim 8, wherein
the fluid is an oxidant gas of the fuel cell.

12. A fuel cell system operating method according to claim 1, comprising
operating the movable filter device at a point in time corresponding to at least one of before the fuel cell is made to start generating electricity and before the fuel cell is made to stop generating electricity.

13. The fuel cell system operating method according to claim 12, further comprising
stopping and resuming electricity generation of the fuel cell occur due to stopping and starting up the entire system, the movable filter device is operated before electricity generation is stopped due to stopping the entire system.

14. The fuel cell system operating method according to claim 12, further comprising
stopping and starting electricity generation by the fuel cell occur due to temporarily stopping and resuming operation of the fuel cell and the movable filter device is operated at least before electricity generation is started by resuming operation of the fuel cell.

15. The fuel cell system according to claim 2, wherein
the movable filter device comprises a filter main body through which the fuel exhaust gas passes, and a drive mechanism that imparts at least one of a rotation and a vibration to the filter main body.

16. A fuel cell system comprising:
a fuel cell that generates electricity with a reaction between a fuel gas and an oxidant gas;
an exhaust flow passage that guides a fuel exhaust gas discharged from a fuel pole of the fuel cell to outside the system;
a movable filter device arranged in the exhaust flow passage, the movable filter device comprising a filter main body through which the fuel exhaust gas passes, and a drive mechanism that imparts at least one of a rotation and a vibration to the filter main body, the drive mechanism including a motor that rotates the filter main body; and
a control unit operatively coupled to the movable filter device to control operation of the movable filter device, the control unit operating the movable filter device to scatter water on the movable filter device prior to completing shutdown of the fuel cell system during a stopping procedure of the fuel cell system, and the control unit not operating the movable filter while the fuel cell temporarily stops electric power generation.

17. The fuel cell system according to claim 3, wherein
the filter main body is rotatably supported, and
the drive mechanism includes a magnetic coupling comprising a rotation magnet on a filter main body side and a drive magnet on a drive source side, the rotational axis of the rotation magnet and the rotational axis of a rotary shaft being arranged offset from each other.

18. The fuel cell system according to claim 4, wherein
the filter main body is rotatably supported, and
the drive mechanism includes a magnetic coupling comprising a rotation magnet on a filter main body side and a drive magnet on a drive source side, the rotational axis of the rotation magnet and the rotational axis of a rotary shaft being arranged offset from each other.

* * * * *